(12) United States Patent
Sharma et al.

(10) Patent No.: US 11,495,017 B2
(45) Date of Patent: *Nov. 8, 2022

(54) VIRTUALIZATION OF TANGIBLE INTERFACE OBJECTS

(71) Applicant: Tangible Play, Inc., Palo Alto, CA (US)

(72) Inventors: Pramod Kumar Sharma, San Jose, CA (US); Jerome Scholler, San Francisco, CA (US)

(73) Assignee: Tangible Play, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/938,913

(22) Filed: Jul. 25, 2020

(65) Prior Publication Data
US 2021/0279466 A1 Sep. 9, 2021

Related U.S. Application Data

(63) Continuation of application No. 15/908,807, filed on Feb. 28, 2018, now Pat. No. 10,726,266, which is a
(Continued)

(51) Int. Cl.
*G06V 20/20* (2022.01)
*G06F 3/03* (2006.01)
(Continued)

(52) U.S. Cl.
CPC ............ *G06V 20/20* (2022.01); *G06F 1/1632* (2013.01); *G06F 1/1686* (2013.01); *G06F 3/017* (2013.01);
(Continued)

(58) Field of Classification Search
CPC ...... G06F 1/1632; G06F 1/1686; G06F 3/017; G06F 3/0304; G06F 3/0317;
(Continued)

(56) References Cited

U.S. PATENT DOCUMENTS

| D310,185 S | 8/1990 | Tick |
|---|---|---|
| D351,890 S | 10/1994 | Rasmusson |

(Continued)

FOREIGN PATENT DOCUMENTS

| CN | 201205081 Y | 3/2009 |
|---|---|---|
| CN | 102384343 A | 3/2012 |

(Continued)

OTHER PUBLICATIONS

Extended Eruropean Search Report, 17771299.9, dated Aug. 8, 2019 (8 pages).

(Continued)

*Primary Examiner* — Amy R Hsu
(74) *Attorney, Agent, or Firm* — VLP Law Group, LLP; Michel Bohn

(57) ABSTRACT

An example system includes a computing device located proximate to a physical activity surface, a video capture device, and a detector. The video capture device is coupled for communication with the computing device and is adapted to capture a video stream that includes an activity scene of the physical activity surface and one or more interface objects physically intractable with by a user. The detector processes the video stream to detect the one or more interface objects included in the activity scene, to identify the one or more interface objects that are detectable, to generate one or more events describing the one or more interface objects, and to provide the one or more events to an activity application configured to render virtual information on the one or more computing devices based on the one or more events.

20 Claims, 33 Drawing Sheets

Related U.S. Application Data continuation of application No. 15/384,075, filed on Dec. 19, 2016, now Pat. No. 9,939,961, which is a continuation of application No. 15/151,213, filed on May 10, 2016, now Pat. No. 9,552,081, which is a continuation of application No. 14/842,777, filed on Sep. 1, 2015, now Pat. No. 9,354,716, which is a continuation of application No. 13/928,111, filed on Jun. 26, 2013, now Pat. No. 9,158,389.

(60) Provisional application No. 61/714,138, filed on Oct. 15, 2012.

(51) Int. Cl.
*G06F 3/0346* (2013.01)
*G06F 3/01* (2006.01)
*G06F 3/042* (2006.01)
*G06F 3/04883* (2022.01)
*G06F 1/16* (2006.01)
*G06V 40/20* (2022.01)
*H04N 5/225* (2006.01)
*H04N 5/232* (2006.01)

(52) U.S. Cl.
CPC .......... *G06F 3/0304* (2013.01); *G06F 3/0317* (2013.01); *G06F 3/0346* (2013.01); *G06F 3/0425* (2013.01); *G06F 3/04883* (2013.01); *G06V 40/28* (2022.01); *H04N 5/2252* (2013.01); *H04N 5/23296* (2013.01)

(58) Field of Classification Search
CPC .. G06F 3/0346; G06F 3/0425; G06F 3/04883; G06K 9/00355; G06K 9/00671; H04N 5/2252; H04N 5/23296
See application file for complete search history.

(56) References Cited

U.S. PATENT DOCUMENTS

| | | | |
|---|---|---|---|
| D365,588 S | 12/1995 | Fernandez | |
| D409,895 S | 5/1999 | Schron et al. | |
| 6,175,954 B1 | 1/2001 | Nelson et al. | |
| D476,555 S | 7/2003 | Niwa | |
| D535,869 S | 1/2007 | Brunsteter | |
| D545,183 S | 6/2007 | French et al. | |
| D563,452 S | 3/2008 | Tan et al. | |
| 7,511,703 B2 | 3/2009 | Wilson et al. | |
| 7,777,899 B1 | 8/2010 | Hildreth | |
| 8,126,264 B2 | 2/2012 | Kaftory et al. | |
| D658,977 S | 5/2012 | Riddell et al. | |
| D659,527 S | 5/2012 | Boucher-Gagne et al. | |
| 8,274,535 B2 | 9/2012 | Hildreth et al. | |
| 8,384,719 B2 | 2/2013 | Reville et al. | |
| D682,463 S | 5/2013 | Bernard | |
| D696,104 S | 12/2013 | Kampl | |
| 8,611,587 B2 | 12/2013 | Horovitz | |
| 8,624,932 B2 | 1/2014 | Hildreth et al. | |
| 8,698,873 B2 | 4/2014 | Barrus | |
| D716,362 S | 10/2014 | Generotti | |
| D718,609 S | 12/2014 | O'Neill et al. | |
| D726,804 S | 4/2015 | Voss | |
| 9,049,482 B2 | 6/2015 | Reichelt | |
| 9,158,389 B1 | 10/2015 | Sharma et al. | |
| 9,235,768 B1 | 1/2016 | Pashintsev et al. | |
| D756,210 S | 5/2016 | Downs | |
| D757,215 S | 5/2016 | Gehrung et al. | |
| 9,354,716 B1 | 5/2016 | Sharma et al. | |
| 9,383,895 B1 | 7/2016 | Vinayak et al. | |
| 9,423,939 B2 | 8/2016 | Schwesinger et al. | |
| D770,556 S | 11/2016 | Sharma et al. | |
| 9,552,081 B1 | 1/2017 | Sharma et al. | |
| 9,568,143 B2 | 2/2017 | Ben et al. | |
| 9,696,547 B2 * | 7/2017 | Kinnebrew | G06F 3/011 |
| D794,698 S | 8/2017 | Gal | |
| 9,805,511 B2 | 10/2017 | Hintermeister et al. | |
| 9,807,130 B2 * | 10/2017 | Blattner | H04L 12/1822 |
| 9,824,495 B2 | 11/2017 | Hagbi et al. | |
| D815,939 S | 4/2018 | Geiger et al. | |
| 9,939,961 B1 | 4/2018 | Sharma et al. | |
| D819,434 S | 6/2018 | Sonneman | |
| 10,033,943 B1 | 7/2018 | Sharma et al. | |
| D827,405 S | 9/2018 | Chun | |
| D832,495 S | 10/2018 | Antony et al. | |
| D833,509 S | 11/2018 | Scholler et al. | |
| 10,125,915 B1 | 11/2018 | Phifer et al. | |
| D835,825 S | 12/2018 | Koerth et al. | |
| D835,826 S | 12/2018 | Koerth et al. | |
| 10,344,910 B1 | 7/2019 | Lye | |
| D859,507 S | 9/2019 | Scholler et al. | |
| 10,657,694 B2 | 5/2020 | Sharma et al. | |
| 2001/0001303 A1 | 5/2001 | Ohsuga et al. | |
| 2005/0166163 A1 * | 7/2005 | Chang | G06F 3/0304 382/103 |
| 2007/0228177 A1 | 10/2007 | Lapstun et al. | |
| 2008/0212838 A1 * | 9/2008 | Frigerio | G06T 7/223 382/107 |
| 2009/0080701 A1 | 3/2009 | Meuter et al. | |
| 2009/0273560 A1 | 11/2009 | Kalanithi et al. | |
| 2009/0315740 A1 | 12/2009 | Hildreth et al. | |
| 2009/0315978 A1 | 12/2009 | Wuermlin et al. | |
| 2010/0066763 A1 | 3/2010 | Macdougall et al. | |
| 2010/0091110 A1 * | 4/2010 | Hildreth | G06F 3/011 348/169 |
| 2010/0105525 A1 | 4/2010 | Thukral et al. | |
| 2010/0194863 A1 | 8/2010 | Lopes et al. | |
| 2010/0243850 A1 | 9/2010 | Derry | |
| 2010/0302015 A1 | 12/2010 | Kipman et al. | |
| 2010/0302247 A1 * | 12/2010 | Perez | G06V 20/64 382/103 |
| 2010/0302257 A1 * | 12/2010 | Perez | G06V 40/23 345/474 |
| 2010/0303291 A1 * | 12/2010 | Margolis | G06V 40/103 382/103 |
| 2011/0085705 A1 | 4/2011 | Izadi et al. | |
| 2011/0130159 A1 * | 6/2011 | Chen | G06F 3/0425 345/158 |
| 2011/0210915 A1 | 9/2011 | Shotton et al. | |
| 2011/0298724 A1 * | 12/2011 | Ameling | G06F 3/04883 345/173 |
| 2012/0056800 A1 * | 3/2012 | Williams | G06V 40/103 345/156 |
| 2012/0069051 A1 | 3/2012 | Hagbi et al. | |
| 2012/0113223 A1 * | 5/2012 | Hilliges | G06F 3/011 348/46 |
| 2012/0229590 A1 | 9/2012 | Barrus | |
| 2012/0241567 A1 | 9/2012 | Gillespie-Brown et al. | |
| 2012/0244922 A1 | 9/2012 | Horovitz | |
| 2012/0280948 A1 | 11/2012 | Barrus et al. | |
| 2012/0314021 A1 * | 12/2012 | Tsang | H04N 5/89 348/40 |
| 2013/0154985 A1 | 6/2013 | Miyazaki | |
| 2013/0193909 A1 | 8/2013 | Blevins | |
| 2013/0215292 A1 | 8/2013 | Reichelt | |
| 2013/0321447 A1 | 12/2013 | Horovitz et al. | |
| 2014/0160122 A1 | 6/2014 | Chou | |
| 2014/0168073 A1 | 6/2014 | Chizeck et al. | |
| 2014/0188756 A1 | 7/2014 | Ponnavaikko et al. | |
| 2014/0191976 A1 | 7/2014 | Peevers et al. | |
| 2014/0377733 A1 | 12/2014 | Olsen | |
| 2015/0048233 A1 * | 2/2015 | Dumas | F16M 11/32 248/125.7 |
| 2015/0123966 A1 * | 5/2015 | Newman | G06T 19/006 345/419 |
| 2015/0189781 A1 | 7/2015 | Klepar | |
| 2015/0205777 A1 | 7/2015 | Campanelli et al. | |
| 2015/0254903 A1 | 9/2015 | Sumner et al. | |
| 2015/0339532 A1 | 11/2015 | Sharma et al. | |
| 2016/0169443 A1 | 6/2016 | Keller | |
| 2016/0266386 A1 | 9/2016 | Scott et al. | |
| 2016/0282901 A1 | 9/2016 | Sharma et al. | |
| 2017/0059088 A1 | 3/2017 | Galvez | |

(56) References Cited

U.S. PATENT DOCUMENTS

| | | | |
|---|---|---|---|
| 2017/0200383 A1 | 7/2017 | Romero et al. | |
| 2017/0206693 A1 | 7/2017 | Sharma et al. | |
| 2017/0236407 A1* | 8/2017 | Rhoads | G06F 16/29 |
| | | | 455/420 |
| 2017/0249061 A1 | 8/2017 | Popescu et al. | |
| 2018/0284907 A1 | 10/2018 | Kolahdouzan | |
| 2019/0038018 A1 | 2/2019 | Hill et al. | |
| 2019/0156119 A1 | 5/2019 | Sharma et al. | |
| 2019/0195417 A1 | 6/2019 | Kwasniewski | |
| 2019/0301670 A1 | 10/2019 | Glickstein et al. | |
| 2020/0089085 A1 | 3/2020 | Solomon et al. | |

FOREIGN PATENT DOCUMENTS

| | | |
|---|---|---|
| CN | 103366469 A | 10/2013 |
| CN | 107430416 A | 12/2017 |
| JP | 2016-103789 A | 6/2016 |
| WO | 2006/027627 A1 | 3/2006 |
| WO | 2006027627 A1 | 3/2006 |
| WO | 2015/103693 A1 | 7/2015 |
| WO | 2015103693 A1 | 7/2015 |
| WO | 2016/154576 A1 | 9/2016 |
| WO | 2016154576 A1 | 9/2016 |

OTHER PUBLICATIONS

Great Britain Examination Report, Application No. GB 1815079.7, dated Dec. 10, 2018 (3 pages).
International Preliminary Report on Patentability, PCT/US2017/024161, dated Oct. 4, 2018 (9 pages).
International Search Report and Written Opinion received for PCT Patent Application No. PCT/US2019/051601, dated Jan. 31, 2020, 11 pages.
International Search Report and Written Opinion received for PCT Patent Application No. PCT/US2020/036205, dated Sep. 2, 2020, 20 pages.
International Search Report and Written Opinion, PCT/US2015/032041, dated Aug. 27, 2015 (14 pages).
International Search Report and Written Opinion, PCT/US2017/024161, dated Jun. 5, 2017 (18 pages).
International Written Opinion received for PCT Patent Application No. PCT/US2017/024161, dated Jun. 5, 2017, 7 pages.
Invitation to Pay Additional Fees received for PCT Patent Application No. PCT/US19/051601, dated Nov. 14, 2019, 2 pages.
Moya, Diego, Tangible user interface, http://en.wikipedia.org/w/index.php?title=Tangible_user_interface&oldid=549052909, Apr. 6, 2013, (5 pages).
Pedersen, "Grab and Touch: Empirical Research on Tangible Computing and Touch Interaction," Department of Computer Science, Faculty of Science, University of Copenhagen, Denmark, Nov. 2012 (75 pages).
Examination Report, GB1815079.7, dated Dec. 10, 2018 (3 pages).
Extended European Search Report, 17771299.9, dated Aug. 8, 2019 (8 pages).
International Search Report and Written Opinion, PCT/US2019/051601, dated Jan. 31, 2020 (18 pages).
Moya, Tangible user interface, http://en.wikipedia.org/w/index.php?title=Tangible_user_interface&oldid=549052909, Apr. 6, 2013, (5 pages).
Communication under Rule 71(3) EPC Received for EP Application No. 17771299.9, dated Oct. 8, 2021, 6 pages.
Office Action received for GB Patent Application No. 2103883, dated Nov. 17, 2021, 5 pages.
Office Action received for Indian Patent Application No. 202147009680, dated Jan. 29, 2022, 7 pages.
Office Action received for Chinese Patent Application No. 201980075756.3, dated Feb. 25, 2022, 8 pages.

* cited by examiner

VIRTUALIZATION OF TANGIBLE INTERFACE OBJECTS

CROSS-REFERENCE TO RELATED APPLICATIONS

The present application is a continuation of U.S. application Ser. No. 15/908,807, entitled "Virtualization of Tangible Interface Objects", filed Feb. 28, 2018, which is a continuation of U.S. application Ser. No. 15/384,075, entitled "Virtualization of Tangible Interface Objects," filed Dec. 19, 2016, which is a continuation of U.S. application Ser. No. 15/151,213, entitled "Virtualization of Tangible Interface Objects," filed May 10, 2016, now U.S. Pat. No. 9,552,081, which is a continuation of U.S. application Ser. No. 14/842,777, entitled "Virtualization of Tangible Interface Objects," filed Sep. 1, 2015, now U.S. Pat. No. 9,354,716, which is a continuation of U.S. application Ser. No. 13/928,111, entitled "Virtualization of Tangible Interface Objects," filed on Jun. 26, 2013, now U.S. Pat. No. 9,158,389, which claims the benefit under 35 U.S.C. § 119(e) of U.S. Provisional Patent Application Ser. No. 61/714,138, entitled "Platform Design for Adding Tangible User Interfaces to Mobile Applications," filed on Oct. 15, 2012, the entire contents of each of which is incorporated herein by reference.

BACKGROUND

The present disclosure relates to virtualizing tangible interface objects.

A tangible user interface is a physical environment that a user can physically interact with to manipulate digital information. While the tangible user interface has opened up a new range of possibilities for interacting with digital information, significant challenges remain when implementing such an interface. For instance, existing tangible user interfaces generally require expensive, high-quality sensors to digitize user interactions with this environment, which results in systems incorporating these tangible user interfaces being too expensive for most consumers.

SUMMARY

According to one innovative aspect of the subject matter in this disclosure, a physical activity surface visualization system includes a computing device located proximate to a physical activity surface, a video capture device, and a detector. The video capture device is coupled for communication with the computing device and is adapted to capture a video stream that includes an activity scene of the physical activity surface and one or more interface objects physically intractable with by a user. The detector is executable by one or more processors of the computing device to process the video stream to detect the one or more interface objects included in the activity scene, to identify the one or more interface objects that are detectable, to generate one or more events describing the one or more interface objects, and to provide the one or more events to an activity application configured to render virtual information on the one or more computing devices based on the one or more events. The detector is coupled to the video capture device to receive the video stream.

Generally another innovative aspect of the subject matter described in this disclosure may be embodied in methods that include capturing, using a video capture device, a video stream that includes an activity scene of a physical activity surface and one or more interface objects physically intractable with by a user; processing, using one or more computing devices, the video stream to detect the one or more interface objects included in the activity scene; identifying, using the one or more computing devices, the one or more interface objects that are detected; and presenting virtual information on the one or more computing devices based on the one or more interface objects that are identified.

A further innovative aspect of the subject matter may generally include an adapter adapting a camera integrated with a computing device that includes a housing including a slot on a first side, the slot configured to receive and retain an edge of a body of the computing device, the housing configured to cover at least a portion of the field of view of the camera of the computing device, and a reflective element recessed at an angle into the first side of the housing to redirect the field of view of the camera toward an activity surface located proximate the computing device.

Other implementations of one or more of these aspects include corresponding systems, apparatus, and computer programs, configured to perform the actions of the methods, encoded on computer storage devices. These and other implementations may each optionally include one or more of the following features.

For instance, the operations may further include processing the video stream further includes receiving an image of the activity scene, processing the image for one or more contours of each of the one or more interface objects included in the activity scene, constructing an object description for each of the one or more interface objects based on the one or more contours, and inferring an object shape for each of the one or more interface objects based on the object description associated with each of the one or more interface objects; that constructing the object description for each of the one or more interface objects includes mapping the one or more contours associated with each of the one or more interface objects using a coordinate system, and inferring the object shape for each of the one or more interface objects includes inferring the object shape for each of the one or more interface objects based on coordinates of the one or more contours associated with each of the one or more interface objects; determining one or more of an orientation and a position within the activity scene for each of the one or more interface objects based on the object description of each of the one or more interface objects; that the virtual information is generated based on the one or more of the orientation and the position of each of the one or more interface objects; identifying the one or more interface objects includes identifying each of the one or more interface objects based on the object shape of each of the one or more interface objects, respectively; that at least one interface object of the one or more interface objects includes an image and processing the video stream further includes processing the image of the activity scene for one or more contours of the image of the at least one interface object and constructing a description of the image of the at least one interface object based on the one or more contours of the image; identifying the at least one interface object includes identifying the image of the at least one interface object based on the description associated with the image; that constructing the description of the image of the at least one interface object includes mapping the one or more contours associated with the image using a coordinate system; that at least one interface object of the one or more interface objects includes an image and processing the video stream further includes calculating one or more of a moment for the image of the at least one interface object and a color histogram for the image of the at least one interface object, and identifying the at least one interface object includes identifying the image of the at least one interface object based on one or more of the moment and the color histogram; that capturing, using the video capture device, the video stream includes receiving an image frame portraying the activity scene, comparing the image portraying the activity scene image to a previously received image frame portraying the activity scene, determining whether a substantial difference exists between the image frame and the previously received image frame, proceeding to process the video stream to detect the one or more interface objects included in the activity scene if the substantial difference is determined to exist, and waiting for a subsequent image frame portraying the activity scene if the substantial difference is determined not to exist; receiving one or more events for the one or more interface objects present in the activity scene; determining the one or more interface objects based on the one or more events; executing one or more routines based on the one or more interface objects to generate object-related information visualizing the one or more interface objects; that presenting the virtual information on the computing device includes presenting the object-related information to visualize the one or more interface objects to the user; generating one or more events for the one or more interface objects, respectively, based on an identity of each of the interface objects; executing one or more routines based on the one or more events to generate information related to the one or more interface objects for presentation; that presenting the virtual information on the computing device includes presenting the object-related information; that the video stream further includes a split view having the activity scene including the activity surface and a user scene including one or more of a face and one or more extremities of the user; processing the user scene for a user input; and generating the virtual information for presentation based on the one or more interface objects that are identified and the user input processed from the user scene.

In addition, various implementations may further optionally include one or more of the following features: an adapter covering at least a portion of the field of view of the video capture device, the adapter configured to redirect at least a portion of the field of view of the video capture device to the physical activity surface; that video capture device is integrated with the computing device, the computing device includes a housing, and the adapter is coupled to the housing of the computing device to cover at least the portion of the field of view of the video capture device; that the adapter includes a housing having a slot that is configured to receive and removeably retain an edge of the housing of the computing device; a stand placeable on the activity surface and configured to position a display of the computing device for viewing by a user, the display including the video capture device and the video capture device facing the user; a calibrator executable by the one or more processors to calibrate the video capture device for one or more of a geometry of the physical activity surface visualization system and image processing performed by the detector; a stand placeable on the activity surface and configured to position a display of the computing device for viewing by a user; and an adapter covering at least a portion of the field of view of a the video capture device, the video capture device facing the user and the adapter configured to redirect at least a portion of the field of view of the video capture device toward the physical activity surface.

Numerous features and advantages of the technology presented herein are described throughout this disclosure. However, it should be understood, however, that the features and advantages described herein are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein provides a platform for virtualizing a physical environment of tangible interface (TI) objects manipulatable by the user. In some implementations, the platform may augment a handheld computing device, such as a phone or tablet, with novel hardware accessories to make use of a built-in video camera on the computing device, and utilize novel computer vision algorithms to sense user interaction with the TI objects, although numerous other implementations and configurations of the platform are contemplated and described herein.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) TI objects and/or TI object interactions simultaneously without overwhelming the computing device, recognizing TI objects with substantially perfect recall and precision (e.g., 99% and 99.5%, respectively), being capable of adapting to lighting changes and wear and tear of TI objects, providing a collaborative tangible experience between users in disparate locations, being intuitive to setup and use even for young users (e.g., 3+ years old), being natural and intuitive to use, and requiring few or no constraints on the types of TI objects that can be processed. For instance, in some implementations, no specialized markers or symbols are required to be included on the TI objects in order for the platform to recognize the TI objects.

The TI objects used by the platform may be everyday objects used by and available to the user, specialized objects created for a specific purpose, a combination of the foregoing, etc. Non-limiting examples of TI objects include various consumer products, game pieces, clothing, toys, figurines, photographs, pre-configured cards, etc. The TI objects may have a substantially two-dimensional or three-dimensional shape.

Figure 1A:
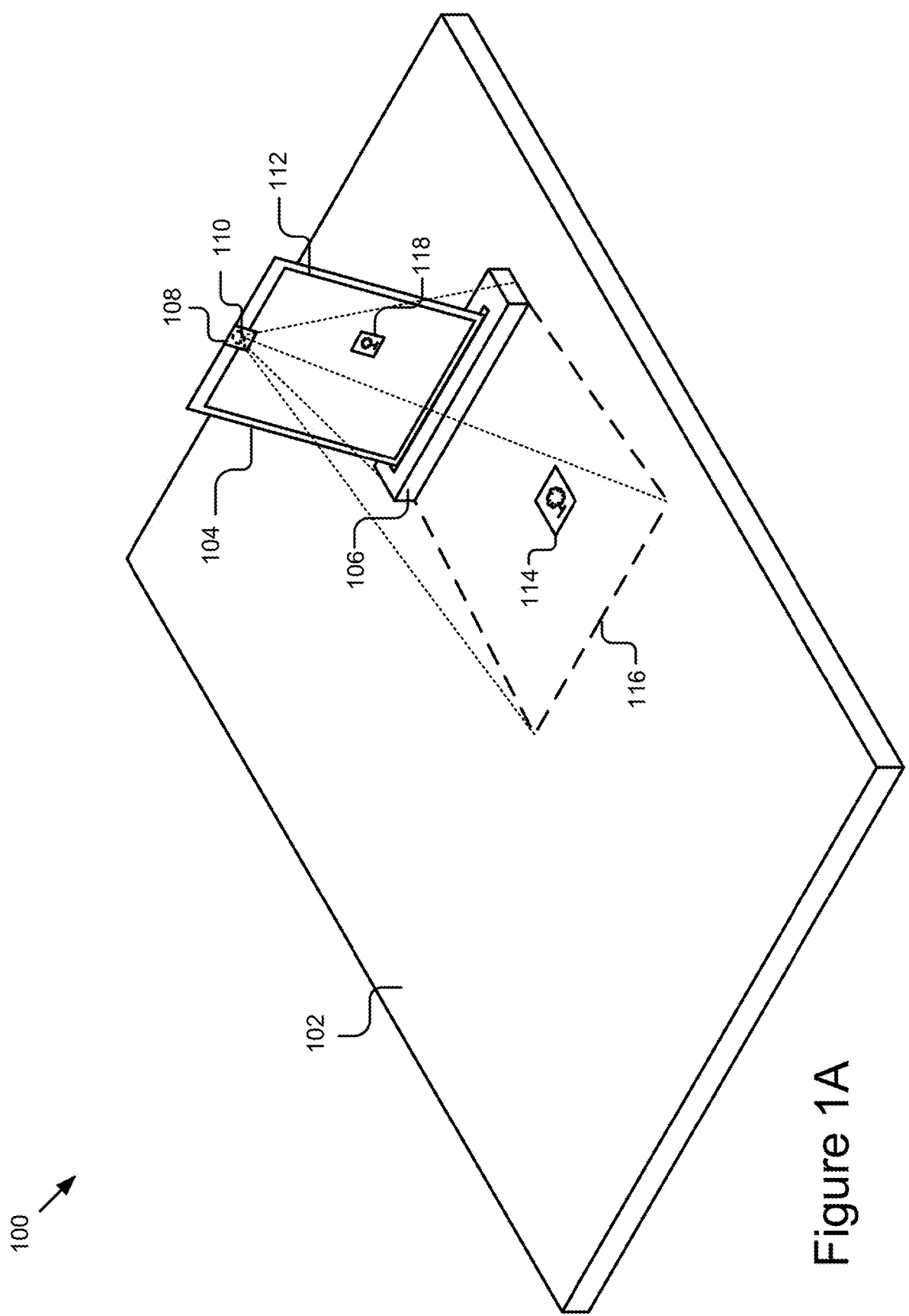
FIGS. 1A-1C are block diagrams illustrating example configurations for virtualizing tangible interface objects.
Figure 1B:
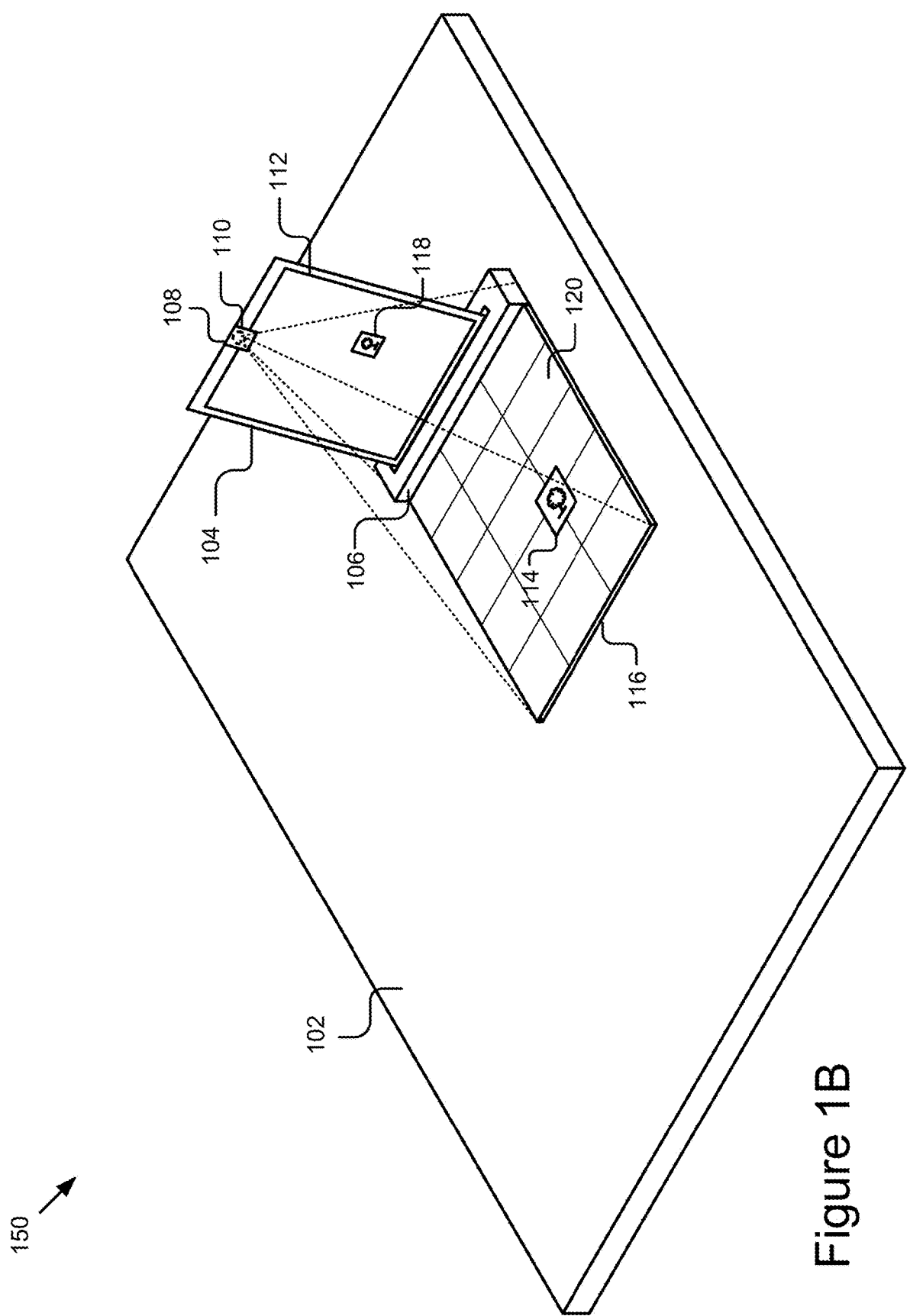
Figure 1C:
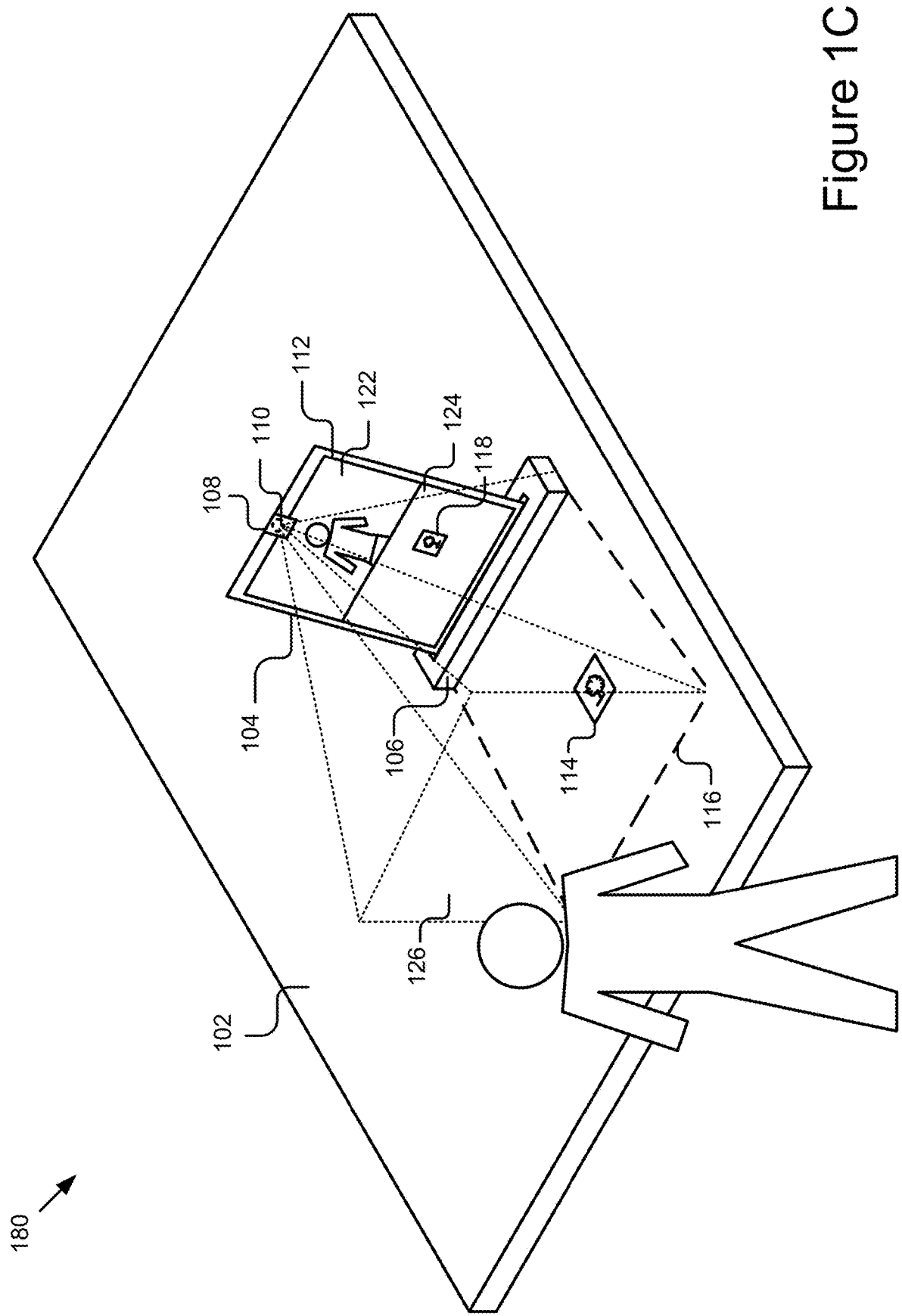

FIGS. 1A-1C are block diagrams illustrating example configurations 100, 150, and 180 for virtualizing the TI objects. As depicted, the configurations 100, 150, and 180 include, in part, an activity surface 102 on which TI object(s) 114 can be placed and a computing device 104 that is equipped or otherwise coupled to a video capture device 110 configured to capture video of the activity surface 102 and that includes novel software and/or hardware capable of processing the video to detect and recognize the TI object(s) 114 and their manipulation by one or more users and provide for the virtualization and visualization of the TI objects and/or their manipulation (e.g., see virtualized TI object(s) 118).

While the activity surface 102 is depicted as substantially horizontal in FIGS. 1A-1C, it should be understood that the activity surface 102 can be vertical or positioned at any other angle suitable to the user for interaction. The activity surface 102 can have any color, pattern, texture, and topography. For instance, the activity surface 102 can be substantially flat or be disjointed/discontinuous in nature. Non-limiting examples of an activity surface 102 include a table, desk, counter, ground, a wall, a whiteboard, a chalkboard, a customized surface, etc.

In some implementations, the activity surface 102 may be preconfigured for certain activities. For instance, the activity surface 102 may constitute or include the board of a board game. As depicted in FIG. 1B, an example configuration may include an activity surface 102 that includes a pre-configured board 120. The board 120 may be integrated with the stand 106 or may be distinct from the stand 106 but placeable adjacent to the stand 106. The board 120 can indicate to the user the boundaries of the activity surface 102 that is within the field of view of the video capture device 110. The board 120 may include a pattern that coincides with an application operable on the computing device 104. The board 120 may be configured for specific activities or may be generic. For instance, the board 120 may include a context (e.g., textual and/or graphical indicators) that signifies objectives for user to complete with the UI objects. As a further example, the board 120 may be three-dimensional in nature and include various pre-configured objects for the user to interact with and/or that are configured for interaction with other TI objects. In some instances, the size of the interactive area on the board 120 may be bounded by the field of view of the video capture device 110 and can be adapted by the adapter 108 and/or by adjusting the position of the video capture device 110. In additional examples, the board 120 may be a light projection (e.g., pattern, context, shapes, etc.) projected onto the activity surface 102.

The computing device 104 included in the example configurations 100, 150, and 180 may be situated on the surface 102 or otherwise proximate to the surface 102. The computing device 104 can provide the user(s) with a virtual portal for visualizing the TI objects being manipulated by the user. For example, the computing device 104 may be placed on a table in front of a user so the user can easily see the computing device 104 while interacting with different TI objects placed on the activity surface 102. Example computing devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 104 includes or is otherwise coupled (e.g., via a wireless or wired connection) to a video capture device 110 (also referred to herein as a camera) for capturing a video stream of the activity surface 102. As depicted in FIGS. 1A-1C, the video capture device 110 may be a front-facing camera that is equipped with an adapter 108 that adapts the field of view of the camera 110 to include, at least in part, the activity surface 102. For clarity, the portion 116 of the activity surface 102 captured by the video capture device 110 is also interchangeably referred to herein as the activity surface or the activity scene.

As depicted in FIGS. 1A-1C, the computing device 104 and/or the video capture device 110 may be positioned and/or supported by a stand 106. For instance, the stand 106 may position the display 112 of the video capture device 110 in a position that is optimal for viewing and interaction by the user who is simultaneously interacting with the physical environment (activity scene 116). The stand 106 may be configured to rest on the activity surface 102 and receive and sturdily hold the computing device 104 so the computing device 104 remains still during use.

In some implementations, the adapter 108 adapts a video capture device 110 (e.g., front-facing, rear-facing camera) of the computing device 104 to capture substantially only the activity scene 116, although numerous further implementations are also possible and contemplated. For instance, the camera adapter 108 can split the field of view of the front-facing camera into two scenes as shown in FIG. 1C. In this figure, the video capture device 110 captures an activity scene 116 that includes a portion of the activity surface 102 situated in front of the video capture device 110 and captures a user scene 126 that includes the user (who in FIG. 1C is situated substantially in front of the computing device 104). These scenes can be virtually rendered as shown in regions 124 and 122 of the display 112. In another example, the camera adapter 108 can redirect a rear-facing camera of the computing device (not shown) toward a front-side of the computing device 104 to capture the activity scene 116 of the activity surface 102 located in front of the computing device 104. In some implementations, the adapter 108 can define one or more sides of the scene being captured (e.g., top, left, right, with bottom open).

Figure 19:
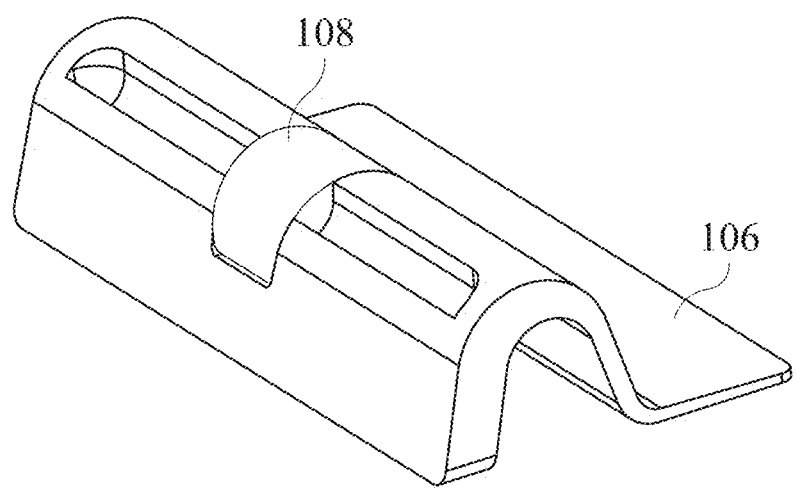

FIGS. 15-18 depict various examples of an adapter 108 and stand 106 for a computing device 104. As shown in these figures, the adapter 108 may include a slot 134 for retaining (e.g., receiving, securing, gripping, etc.) an edge of the computing device 104 so as to cover at least a portion of the camera 110. The adapter 108 may include at least one optical element 132 (e.g., a mirror) to direct the field of view of the camera 110 toward the activity surface 102. The computing device 104 may be placed in and received by a compatibly sized slot 136 formed in a top side of the stand 106. The slot 136 may extend at least partially downward into a main body of the stand 106 at angle so that when the computing device 104 is secured in the slot, it is angled back for convenient viewing and utilization by its user or users. The stand 106 may include a channel 130 formed perpendicular to and intersecting with the slot 136. The channel 130 may be configured to receive and secure the adapter 108 when not in use. For example, the adapter 108 may have a tapered shape that is compatible with and configured to be easily placeable in the channel 130 of the stand 106. In some instances, the channel 130 may magnetically secure the adapter 108 in place to prevent the adapter 108 from being easily jarred out of the channel 130. For example, the adapter 108 and the stand 106 may include compatible magnets that engage when the adapter 108 is aligned in the channel 130 as shown in FIG. 19. The stand 106 may be elongated along a horizontal axis to prevent the computing device 104 from tipping over when resting on a substantially horizontal activity surface (e.g., a table). The stand 106 may include channeling for a cable that plugs into the computing device 104. The cable may be configured to provide power to the computing device 104 and/or may serve as a communication link to other computing devices, such as a laptop or other personal computer.

In some implementations, the adapter 108 may include one or more optical elements, such as mirrors and/or lenses, to adapt the standard field of view of the video capture device 110. For instance, the adapter 108 may include one or more mirrors and lenses to redirect and/or modify the light being reflected from activity surface 102 into the video capture device 110. As an example, the adapter 108 may include a mirror angled to redirect the light reflected from the activity surface 102 in front of the computing device 104 into a front-facing camera of the computing device 104. As a further example, many wireless handheld devices include a front-facing camera with a fixed line of sight with respect to the display 112. The adapter 108 can be detachably connected to the device over the camera 110 to augment the line of sight of the camera 110 so it can capture the activity surface 102 (e.g., surface of a table).

In another example, the adapter 108 may include a series of optical elements (e.g., mirrors) that wrap light reflected off of the activity surface 102 located in front of the computing device 104 into a rear-facing camera of the computing device 104 so it can be captured. The adapter 108 could also adapt a portion of the field of view of the video capture device 110 (e.g., the front-facing camera) and leave a remaining portion of the field of view unaltered so that multiple scenes may be captured by the video capture device 110 as shown in FIG. 1C. The adapter 108 could also include optical element(s) that are configured to provide different effects, such as enabling the video capture device 110 to capture a greater portion of the activity surface 102. For example, the adapter 108 may include a convex mirror that provides a fisheye effect to capture a larger portion of the activity surface 102 than would otherwise be capturable by a standard configuration of the video capture device 110.

In some implementations, the video capture device is configured to include the stand 106 within its field of view. The stand 106 may serve as a reference point for performing geometric and/or image calibration of the camera 110. For instance, during calibration, the calibrator 302 (e.g., see FIG. 3) may calibrate the camera 110 (e.g., adjust the white balance, focus, exposure, etc.) of the camera 110 using the stand 106.

The video capture device 110 could, in some implementations, be an independent unit that is distinct from the computing device 104 and may be positionable to capture the activity surface 102 or may be adapted by the adapter 108 to capture the activity surface 102 as discussed above. In these implementations, the video capture device 110 may be communicatively coupled via a wired or wireless connection to the computing device 104 to provide it with the video stream being captured.

Figure 2:
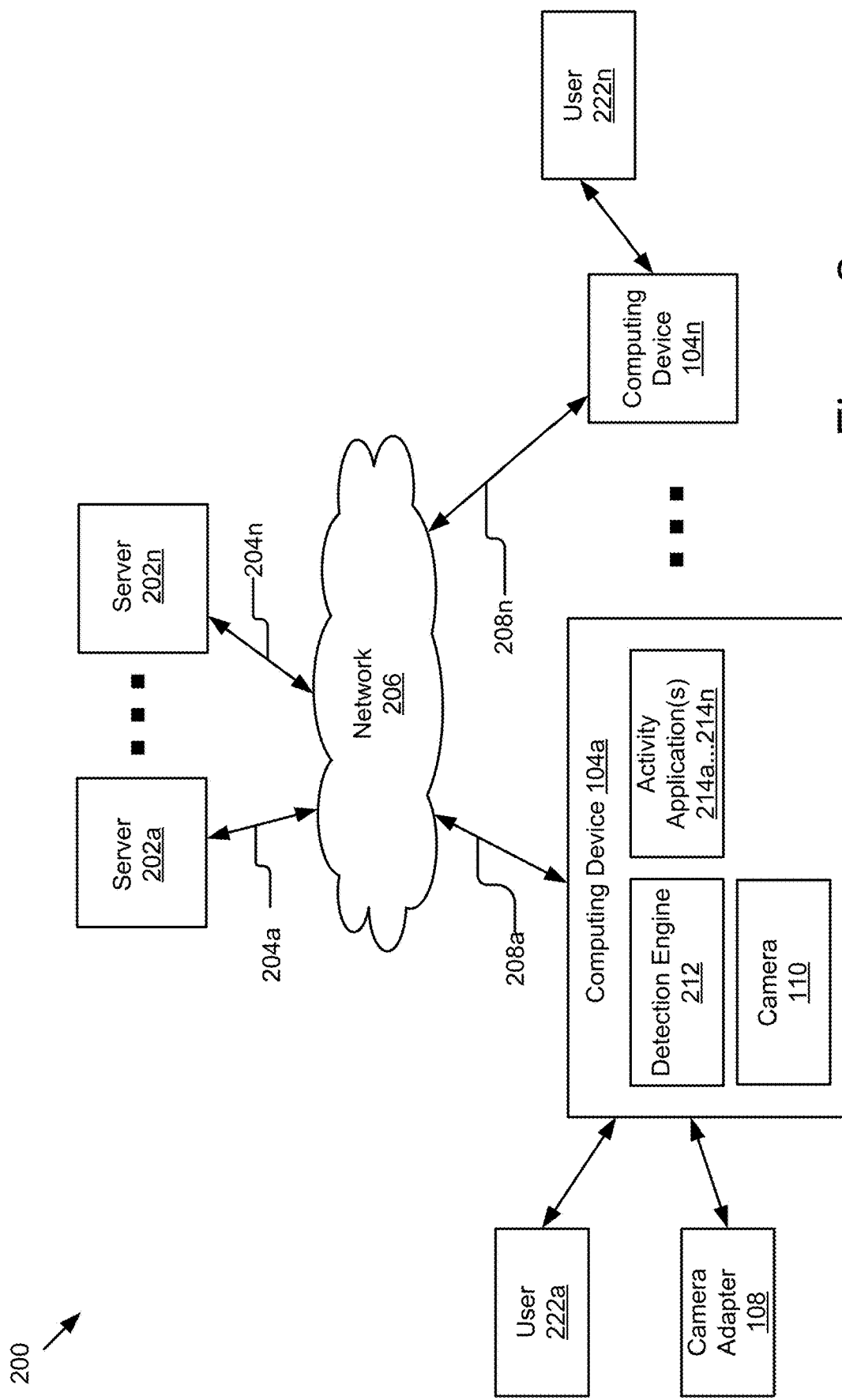
FIG. 2 is a block diagram illustrating an example computer system for virtualizing tangible interface objects.

FIG. 2 is a block diagram illustrating an example computer system 200 for virtualizing tangible interface objects. The illustrated system 200 includes computing devices 104*a* . . . 104*n* (also referred to individually and collectively as 104) and servers 202*a* . . . 202*n* (also referred to individually and collectively as 202), which are communicatively coupled via a network 206 for interaction with one another. For example, the computing devices 104*a* . . . 104*n* may be respectively coupled to the network 206 via signal lines 208*a* . . . 208*n* and may be accessed by users 222*a* . . . 222*n* (also referred to individually and collectively as 222). The servers 202*a* . . . 202*n* may be coupled to the network 206 via signal lines 204*a* . . . 204*n*, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing devices 104*a* . . . 104*n* (also referred to individually and collectively as 104) are computing devices having data processing and communication capabilities. For instance, a computing device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 104*a* . . . 104*n* may couple to and communicate with one another and the other entities of the system 200 via the network 206 using a wireless and/or wired connection. While two or more computing devices 104 are depicted in FIG. 2, the system 200 may include any number of computing devices 104. In addition, the computing devices 104*a* . . . 104*n* may be the same or different types of computing devices.

As depicted in FIG. 2, one or more of the computing devices 104*a* . . . 104*n* may include a camera 110, a detection engine 212, and one or more activity applications 214*a* . . . 214*n* (also referred to individually and collectively as 214). One or more of the computing devices 104 and/or cameras 110 may also be equipped with an adapter 108 as discussed elsewhere herein. The detection engine 212 is capable of detecting and recognizing TI objects located in the activity scene 116 (on the activity surface 102 within field of view of camera 110). The detection engine 212 can detect the position and orientation of the objects in physical space, detect how the objects are being manipulated by the user, and cooperate with the activity application(s) 214 to provide users with a rich virtual experience incorporating those objects and their manipulation. In some implementations, the detection engine 212 processes video captured by a camera 110 to detect and recognize the TI object(s) and their attributes, generate events based on the TI objects and their attributes, and provide the events generated for the recognized objects to one or more activity applications 214. The activity application(s) 214 are capable of processing the events received from the detection engine 212 to provide the rich environment that blends the tangible, physical environment being manipulated by the user with information related to and/or complementing the TI objects. Additional structure and functionality of the computing devices 104 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the computing devices 104. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

In some implementations, a server 202 may include a search engine for retrieving results from a data store that match one or more search criteria. In some instances, the search criteria may include an image and the search engine may compare the image to images of products stored in its data store (not shown) to identify a product that matches the image. In a further example, the detection engine 212 and/or the storage 310 (e.g., see FIG. 3) may signal the search engine to provide information that matches an object and/or image that it has extracted from a video stream.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into to a single computing device or system or additional computing devices or systems, etc.

Figure 3:
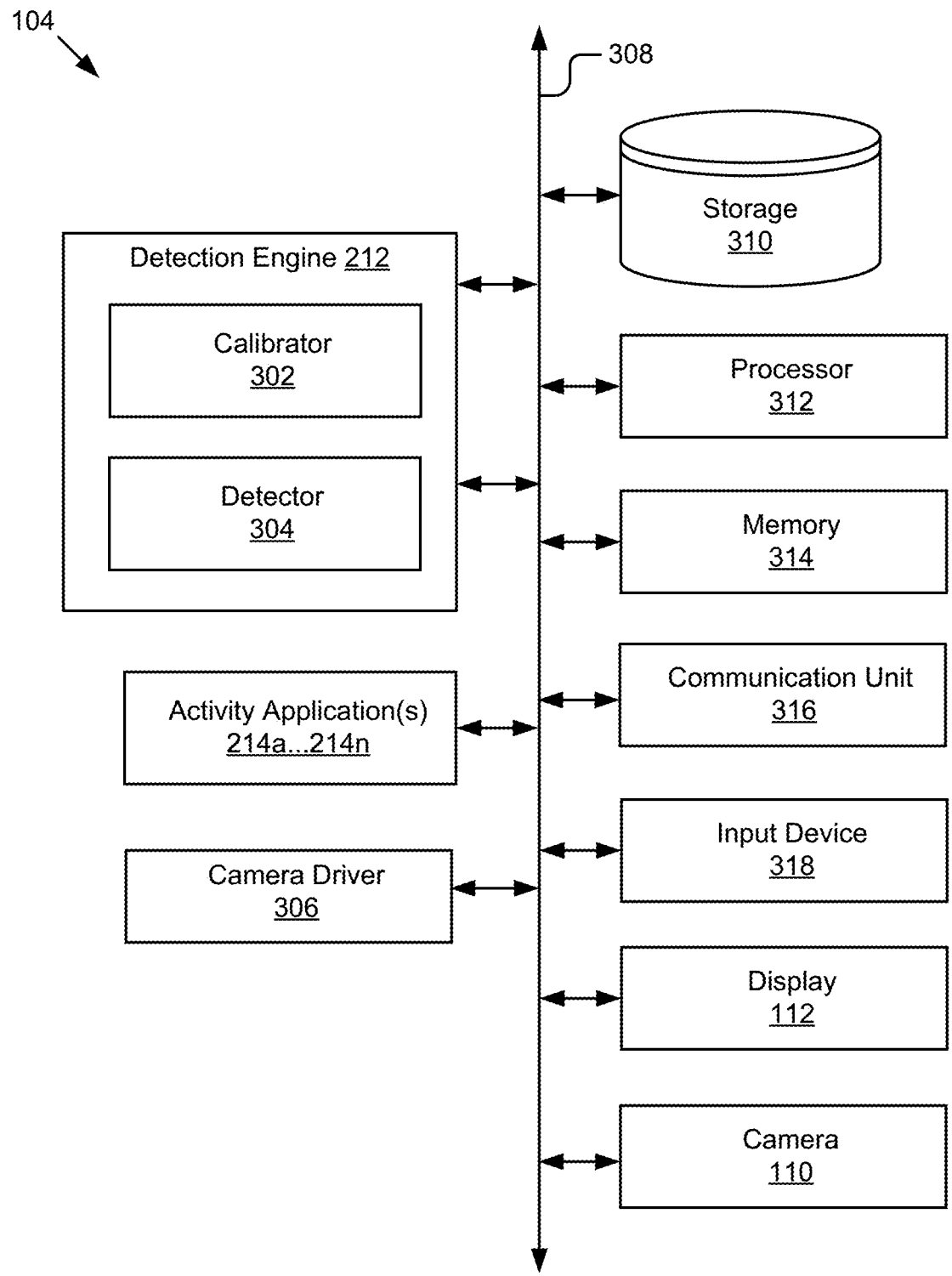
FIG. 3 is a block diagram illustrating an example computing device.

FIG. 3 is a block diagram of an example computing device 104. As depicted, the computing device 104 may include a processor 312, memory 314, communication unit 316, display 112, camera 110, and an input device 318, which are communicatively coupled by a communications bus 308. However, it should be understood that the computing device 104 is not limited to such and may also include other elements, including, for example, those discussed with reference to the computing devices 104 in FIGS. 1 and 2.

The processor 312 may execute software instructions by performing various input/output, logical, and/or mathematical operations. The processor 312 have various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other components of the computing device 104. In some implementations, the memory 314 may store instructions and/or data that may be executed by the processor 312. For example, the memory 314 may store the detection engine 212, the activity applications 214a . . . 214n, and the camera driver 306. The memory 314 is also capable of storing other instructions and data, including, for example, an operating system, hardware drivers, other software applications, data, etc. The memory 314 may be coupled to the bus 308 for communication with the processor 312 and the other components of the computing device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The display 112 may display electronic images and data output by the computing device 104 for presentation to a user 222. The display 112 may include any conventional display device, monitor or screen, including, for example, an organic light-emitting diode (OLED) display, a liquid crystal display (LCD), etc. In some implementations, the display 112 may be a touch-screen display capable of receiving input from one or more fingers of a user 222. For example, the display 112 may be a capacitive touch-screen display capable of detecting and interpreting multiple points of contact with the display surface. In some implementations, the computing device 104 may include a graphics adapter (not shown) for rendering and outputting the images and data for presentation on display 112. The graphics adapter (not shown) may be a separate processing device including a separate processor and memory (not shown) or may be integrated with the processor 312 and memory 314.

The input device 318 may include any device for inputting information into the computing device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 222. For instance, the functionality of the input device 318 and the display 112 may be integrated, and a user 222 of the computing device 104 may interact with the computing device 104 by contacting a surface of the display 112 using one or more fingers. In this example, the user 222 could interact with an emulated (i.e., virtual or soft) keyboard displayed on the touch-screen display 112 by using fingers to contacting the display 112 in the keyboard regions.

The detection engine 212 may include a calibrator 302 and a detector 304. The components 212, 302, and 304 may be communicatively coupled by the bus 308 and/or the processor 312 to one another and/or the other components 214, 306, 310, 314, 316, 318, 112, and/or 110 of the computing device 104. In some implementations, one or more of the components 212, 302, and 304 are sets of instructions executable by the processor 312 to provide their functionality. In some implementations, one or more of the components 212, 302, and 304 are stored in the memory 314 of the computing device 104 and are accessible and executable by the processor 312 to provide their functionality. In any of the foregoing implementations, these components 212, 302, and 304 may be adapted for cooperation and communication with the processor 312 and other components of the computing device 104.

The calibrator 302 includes software and/or logic for performing geometric and image calibration of the camera 110. Geometric calibration includes calibrating the camera 110 to account for the geometry of the platform/video capturing setup (e.g., see FIGS. 1A-1C). For instance, geometric calibration configures the camera 110 to account for the height of the stand 106, angle the camera 110 and/or computing device 104 are positioned at, and/or the characteristics (e.g., size, angle, topography, etc.) of the activity surface 102 and/or board 120, any optical effects induced by the adapter 108 and/or optics of the camera 110, etc. Performing geometric calibration optimizes the images being captured by the camera 110 for objection detection by the detector 304, as discussed in further detail below. Geometric calibration is advantageous is it calibrates camera 110 to account for discontinuities and/or non-uniformities in activity surface 102, thus allowing the technology described herein to be used in a variety of different settings and with a wide variety of activity surface configurations (e.g., bumpy surfaces, whiteboards, tables, beds, etc.). In some implementations, the calibrator 302 can calibrate the camera 110 to optimize it to capture a split field of view that contains both the user in one portion and the activity surface 102 in another portion.

Image calibration includes manipulating the camera 110 to optimize image recognition by the detector 304. In some implementations, the calibrator 302 performs image calibration by verifying and/or adjusting one or more parameters, such as focus, exposure, white balance, aperture, f-stop, image compression, ISO, depth of field, noise reduction, focal length, etc., of the camera 110 to optimize the images of the TI objects being captured by the camera 110 for image recognition, as discussed in further detail below. For example, a known, pre-identified TI object may be place in the activity scene, and the calibrator 302 may process images received from the camera 110 to establish boundaries of the TI object and change various parameters, such as the focus of the camera 110, based on boundaries to optimize the images being received.

The detector 304 includes software and/or logic for processing the video stream captured by the camera 110 to detect and identify TI object(s) included in the activity scene 116. In some implementations, the detector 304 may be couple to and receive the video stream from the camera 110, the camera driver 306, and/or the memory 314. In some implementations, the detector 304 may process the images of the video stream to determine positional information for the TI objects in the activity scene 116 (e.g., location and/or orientation of the TI objects in 2D or 3D space) and then analyze characteristics of the TI objects included in the video stream to determine the identities and/or additional attributes of the TI objects, as discussed in further detail below with reference to at least FIGS. 4-10.

In some implementations, the detector 304 may determine gestures associated with the TI objects that indicate how the TI objects have been manipulated over time by the user(s). For example and not limitation, the detector 304 may determine the following gestures for the TI objects:

Put: indicates TI object has appeared in activity scene 116;

Obscure: indicates TI object still present in activity scene 116 but has been partially or completely obscured (e.g., by a user's hand);

Remove: indicates TI object has disappeared from the activity scene 116;

Swap: indicates one TI object has been swapped in for another TI object (in approximately the same location);

Rotate: indicates TI object has been rotated (e.g., clockwise by 45, 90, 135, 180, 225, 270, 315 degrees, by any floating point value representing an angle, etc.);

Move: indicates object has been moved from one location to another in the activity scene 116;

Align: indicates two objects are somehow aligned (e.g., horizontally, vertically, diagonally, etc.); and Pattern: indicates TI object centers form a pattern (e.g., a line, triangle, circle, square, rectangle, star, etc.).

The detector 304 may expose the TI objects and their attributes to the activity applications 214. For instance, the detector 304 may generate events for the TI objects based on the object-related information determined by the detector 304 for the TI objects, and may pass the events to the to one or more activity applications 214 for use thereby in generating rich virtual environments incorporating the TI objects. An event for a given TI object detected and identified by the detector 304 may include one or more of the following: object ID, object confidence, size of object, shape of object, location of object (e.g., X, Y, Z), orientation of the object, whether object is obscured, how much of object is obscured, confidence object is obscured, gesture associated with object, etc.), although fewer or additional TI object attributes may also be used. The detector 304 may be coupled to the applications 214 (e.g., via the processor 312 and/or the bus 308) to provide the events to the applications 214.

In implementations where the video stream includes multiple scenes, such as scenes 116 and 126 in FIG. 1C, the detector 304 may process each of these scenes independently and simultaneously and discussed in further detail below with reference to at least FIGS. 5A and 5B.

The detector 304 may be coupled to the calibrator 302 to signal it to perform geometric and/or image calibration. In some implementations, the detector 304 may determine whether to signal the calibrator 302 to calibrate the camera 110 based at least in part on whether objects and/or images are being successfully detected, as discussed in further detail below with reference to at least FIGS. 6A and 6B.

The detector 304 may be coupled to the storage 310 via the bus 308 store, retrieve, and otherwise manipulate data stored therein. For example, the detector 304 may query the storage 310 for data matching any TI objects that it has determined as present in the activity scene 116. In some implementations, the detector 304 may compute unique indexes for the objects it detects. The detector 304 may compute the indexes based on the visible and/or audible characteristics of the TI objects, such as images included on the TI objects, shapes of the TI objects, colors of the TI objects, textures of the TI objects, etc. In some implementations, each of the TI objects may include unique images and the detector 304 may perform image recognition on images to determine their identities. In these implementations, corresponding digital records for the TI objects may be indexed and stored in the storage 310, and the detector 304 may query the storage 310 for records matching the TI objects determined by the detector 304 as present in the activity scene 116.

By way of example and not limitation, the TI objects may be a set of equally-sized cards that each bear an image of a different animal. A record for each of the cards may be created and stored in the storage 310. In some cases, the records corresponding to the cards may be imported into the storage 310 (e.g., by downloading them via the network 206 from a remote location (e.g., a server 202). In other cases, a user may create and store the records independently (e.g., via an application that utilizes the TI object detection and index generation capability of the detector 304). Additional examples of TI objects are discussed below with reference to at least FIGS. 11A-14.

The activity applications 214a . . . 214n include software and/or logic for receiving object-related events and running routines based thereon to generate a virtual environment for presentation to the user that incorporates, in real-time, the TI objects and their manipulation, and their relation to one another and the activity surface 102, in the physical activity scene 116. The activity applications 214a . . . 214n may be coupled to the detector 304 via the processor 312 and/or the bus 308 to receive the events. In some implementations, the activity applications 214a . . . 214 may process the events received from the detector 304 to determine the attributes of the object and may render corresponding information for display based on the attributes. For example, an activity application 214 may use the object ID to retrieve a digital representation of the TI object from the storage 310, may user the object confidence to determine whether to even display information about the object (e.g., by comparing the object confidence to a predetermined threshold), may perform an action with the digital representation of the TI object based on the object's position and/or whether the object (or a nearby TI object) has been manipulated, e.g., moved, obscured, swapped, removed, newly added, etc.), may perform an action dependent on what other objects are aligned with and/or adjacent to a given object, etc.

The activity application 214 may enhance the virtual information/environment it generates using supplemental information determined based on the TI objects present in the activity scene 116. For example, an activity application 214 may develop a digital representation of a TI object with additional information (e.g., facts, statistics, news, video, photos, social network posts, microblogs, etc.) about the object, accessories for the object, visual enhancements or improvements to the object, sounds for the object, etc.

Non-limiting examples of the activity applications 214 may include video games, learning applications, assistive applications, storyboard applications, collaborative applications, productivity applications, etc. Various non-limiting examples of the virtual environments that can be rendered by the activity applications 214 are discussed below with reference to at least FIGS. 11A-14.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 104 via the bus 308, and these components may interface with the camera driver 306 via the bus 308 to capture video and/or still images using the camera 110.

As discussed elsewhere herein, the camera 110 is a video capture device configured to capture video of at least the activity surface 102. The camera 110 may be coupled to the bus 308 for communication and interaction with the other components of the computing device 104. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 104 and/or coupled directly to the bus 308. In some embodiments, the processor of the camera 110 may be coupled via the bus 308 to store video and/or still image data in the memory 314 and/or provide the video and/or still image data to other components of the computing device 104, such as the detection engine 212 and/or activity applications 214.

The storage 310 is an information source for storing and providing access to stored data. In some implementations, the storage 310 may include an indexed set of records that correspond to the TI objects that may be placed and manipulated by users in the activity scene 116. In some implementations, records (e.g., image profiles) for the TI objects can be indexed using unique shapes, moment(s), histogram(s), etc. derived from the TI objects. These indexes may be computed using operations that are the same as or substantially similar to those discussed below with reference to at least FIGS. 7-8B.

For example, an application developer may create a set of TI objects for a given activity application 214. To enable the detection engine 212 to detect the TI objects, the application developer may create a corresponding set of records for the TI objects for storage in the storage 310. In other implementations, the storage 310, detector 304, and/or an activity application 214 may include software executable by the processor 312 to query a server 202 for information that matches a previously unidentified TI object.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store 106 using programmatic operations (e.g., SQL queries and statements or a similar database manipulation library). Additional characteristics, structure, acts, and functionality of the storage 310 is discussed elsewhere herein.

Figure 4:
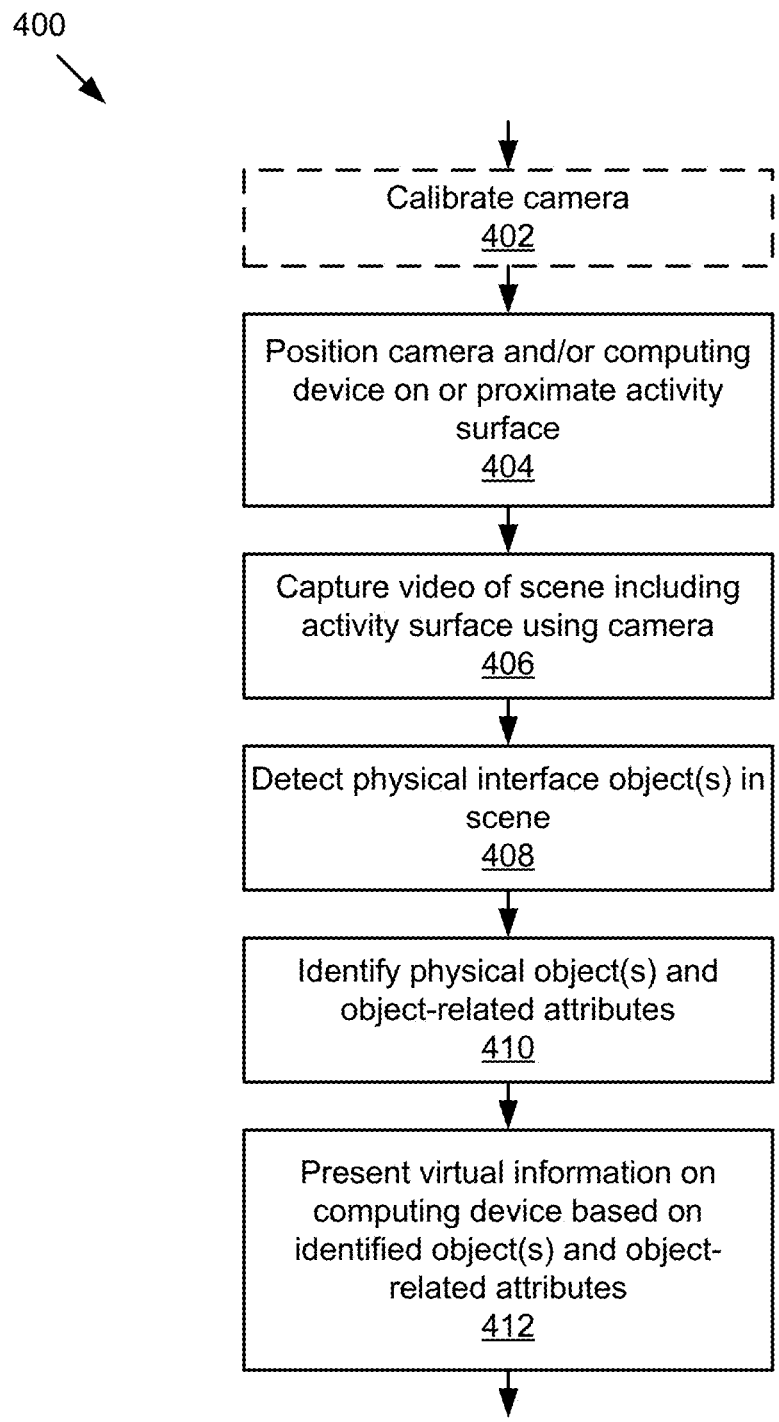
FIG. 4 is a flowchart of an example method for virtualizing tangible interface objects.

FIG. 4 is a flowchart of an example method 400 for virtualizing tangible interface objects. In block 402, the calibrator 302 calibrates the camera 110. In some implementations, the calibrator 302 performs geometric and/or image calibration to prepare the camera 110 for TI object detection and recognition. In block 404, the camera 110 and/or computing device 104 are then positioned on or proximate an activity surface and the video capture device (e.g., the camera 110) captures 406 a video stream that includes an activity scene of the activity surface and one or more interface objects that are physically intractable with by a user. In some implementations, the detector 304 can signal the camera 110 to capture the video stream (e.g., via the camera driver 306) and the camera 110 can provide the video stream to the detector 304 (e.g., directly, via the memory 314, etc.). As shown in FIGS. 1A-1C, a computing device 104 that includes the camera 110 may be placed in a preconfigured stand 106 that positions the camera 110 to capture the activity scene 116 and positions the computing device 104 for viewing and/or interaction with by the user, although numerous further configurations are possible as described elsewhere herein. In some instances, the camera 110 may be adapted with the adapter 108 to optimally adapt the field of view of the camera 110 to capture a region of the activity surface 102 (e.g., table, wall, etc.) located in front of the computing device 104.

Next, the detector 304 processes the video stream to detect 408 one or more TI objects included in the activity scene 116 and identify 410 the one or more TI objects that are detected. FIGS. 5A-9 describe various example operations that can be performed by the detector 304 to detect and identify the TI objects, although additional and/or alternative operations are also possible and contemplated. The method 400 can then present 412 virtual information on the one or more computing devices 104 based on the one or more TI objects that are identified by the detector 304. For example, the detector 304 can pass events for the TI objects detected and identified by it to one or more activity applications 214 for visualization to the user in a virtual scene generated by it based on the events.

Figure 5A:
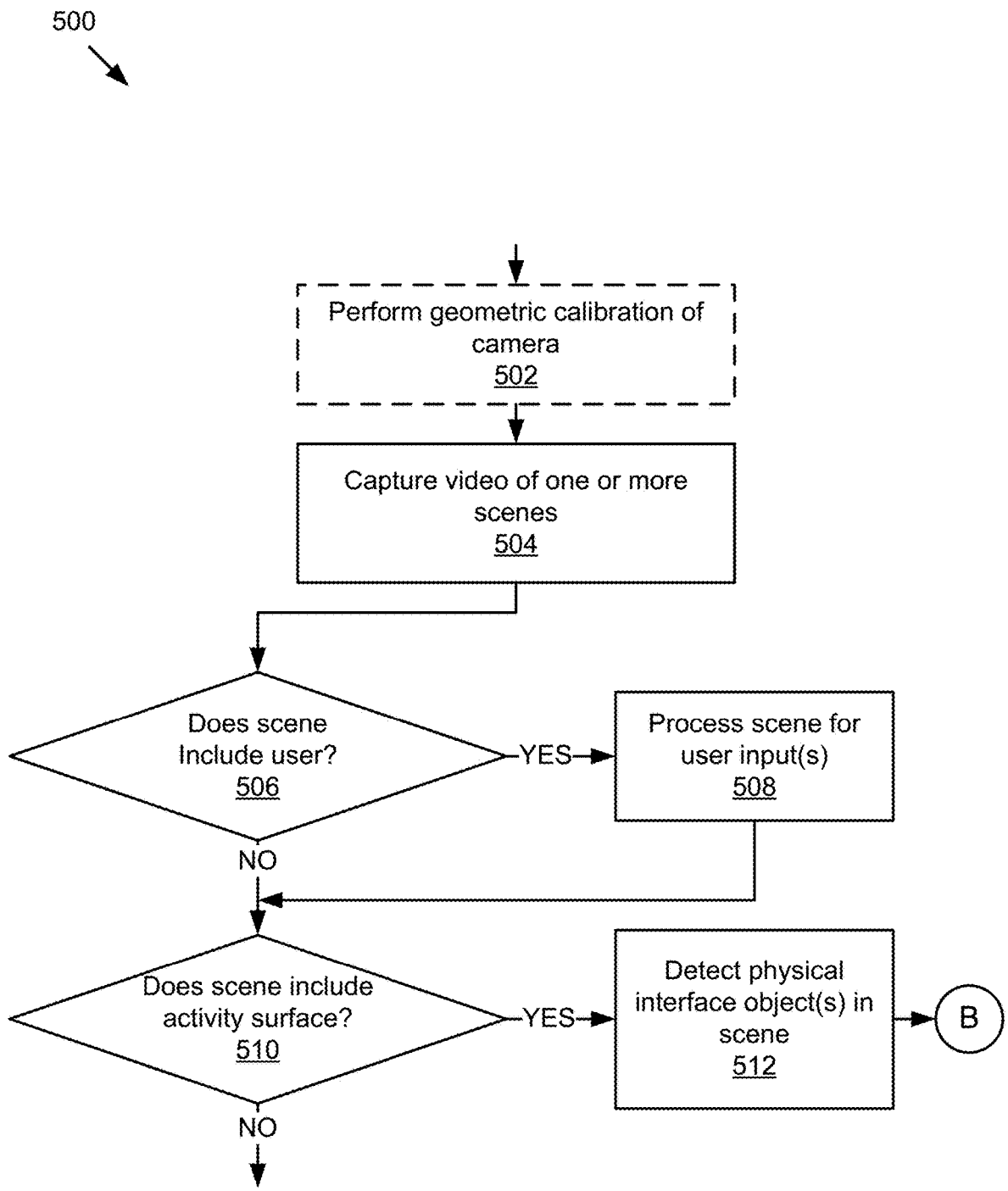
FIGS. 5A and 5B are flowcharts of a further example method for virtualizing tangible interface objects.
Figure 5B:
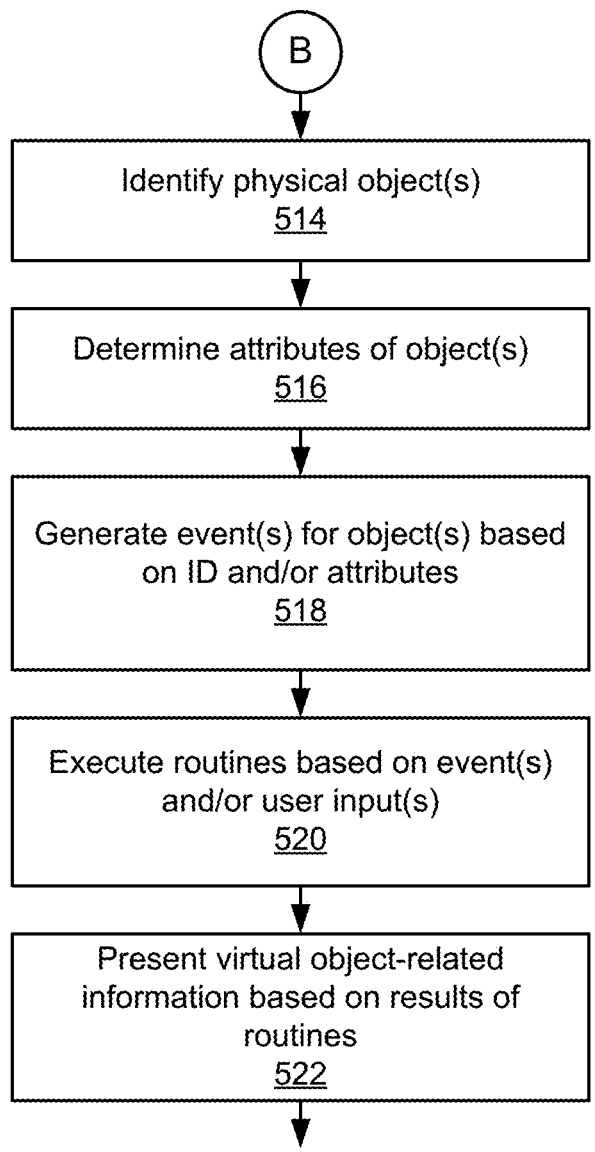

FIGS. 5A and 5B are flowcharts of a further example method 500 for virtualizing tangible interface objects. In block 502, the calibrator 302 may initially perform geometric calibration of the video capture device (e.g., camera 110) and then the video capture device may, in block 504, capture video of one or more scenes. For example, as depicted in FIG. 1C, the camera 110 may capture the activity scene 116 and the user scene 126. In some instances, the field of view of the camera 110 may be split by the adapter 108 into multiple scenes, such as the activity scene 116 and the user scene 126. For instance, for a front facing camera 110, the adapter 108 may leave a portion of the field of view of the camera 110 unmodified to capture video of the users face and/or extremities (e.g., hands), and may redirect a portion of the field of view of the camera 110 downward to capture the activity service 102 using a reflective element, such as a mirror, although other configurations are also possible discussed elsewhere herein.

The detector 304 may then determine 506 whether the video received from the camera 110 contains a scene including a user (i.e., a user scene), and if so, can process 508 the user scene 126 for user inputs, such as speech, facial expressions, hand motions, body language, etc. For example, the detector 304 may process the facial regions and hand regions of a sequence of video images received from the camera 110 to determine whether the user is gesturing, and if so, may determine which gestures are being performed and pass those gestures along with any TI object events that it generates to one or more of the activity applications 214, as discussed elsewhere herein.

Additionally, the detector 304 may determine 510 whether the video received from the camera 110 contains a scene including the activity surface 102 (i.e., an activity scene 116), and if so, may proceed to detect 512 one or more TI objects included in the activity scene 116. If the video received from the camera 110 does not include the activity scene 116, the method 400 may return to block 502 to calibrate the camera 110, proceed to process the user inputs determined in block 508, may return an error prompt to the user indicating there is an issue with the configuration of the platform, may terminate or wait, etc.

In block 514, the detector 304 may identify the TI object(s) included in the activity scene 116, determine 516 attributes for those TI objects(s), and generate 518 corresponding event(s) for the TI object(s) based on their identities and attributes. As described elsewhere herein, attributes that the detector 304 can determine during detection and/or identification of the TI object(s) may include but are not limited to, a confidence for the inferred shape of each TI object, whether the object is obscured and by how much, a confidence for the obscurity determination, gestures associated with the TI object(s), etc. One or more activity applications 214 may receive the object event(s) and/or any user inputs determined by the detector 304, and may execute 520 routines in block 420 based thereon. Based on the results produced by the routines, the one or more activity applications 214 may present virtual object-related information in block 522, such as a rich virtual environment incorporating digital representations of the TI object(s), to the user(s), as discussed elsewhere herein.

Figure 6A:
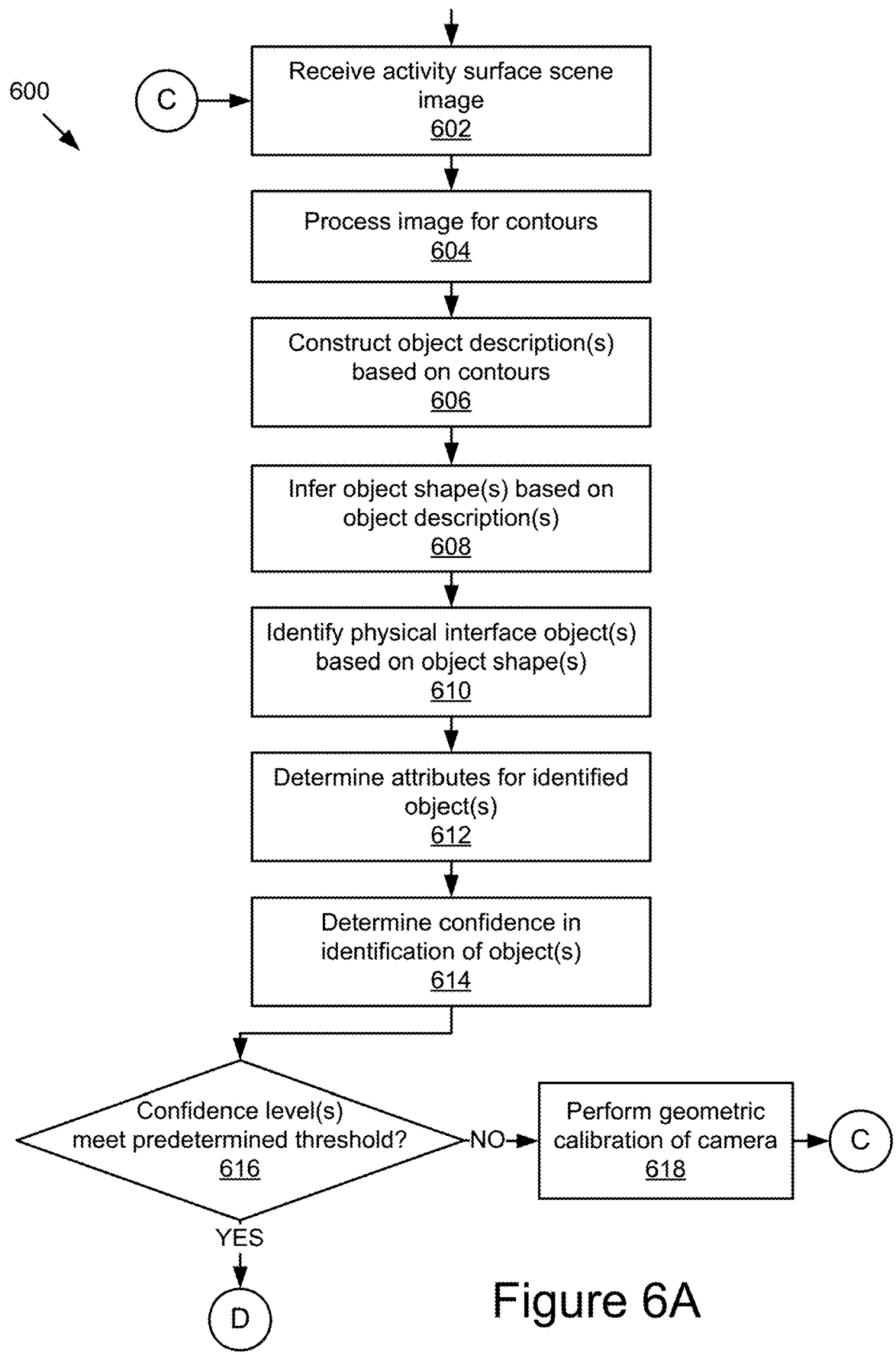
FIGS. 6A and 6B are flowcharts of an example method for tangible interface object detection and recognition.
Figure 6B:
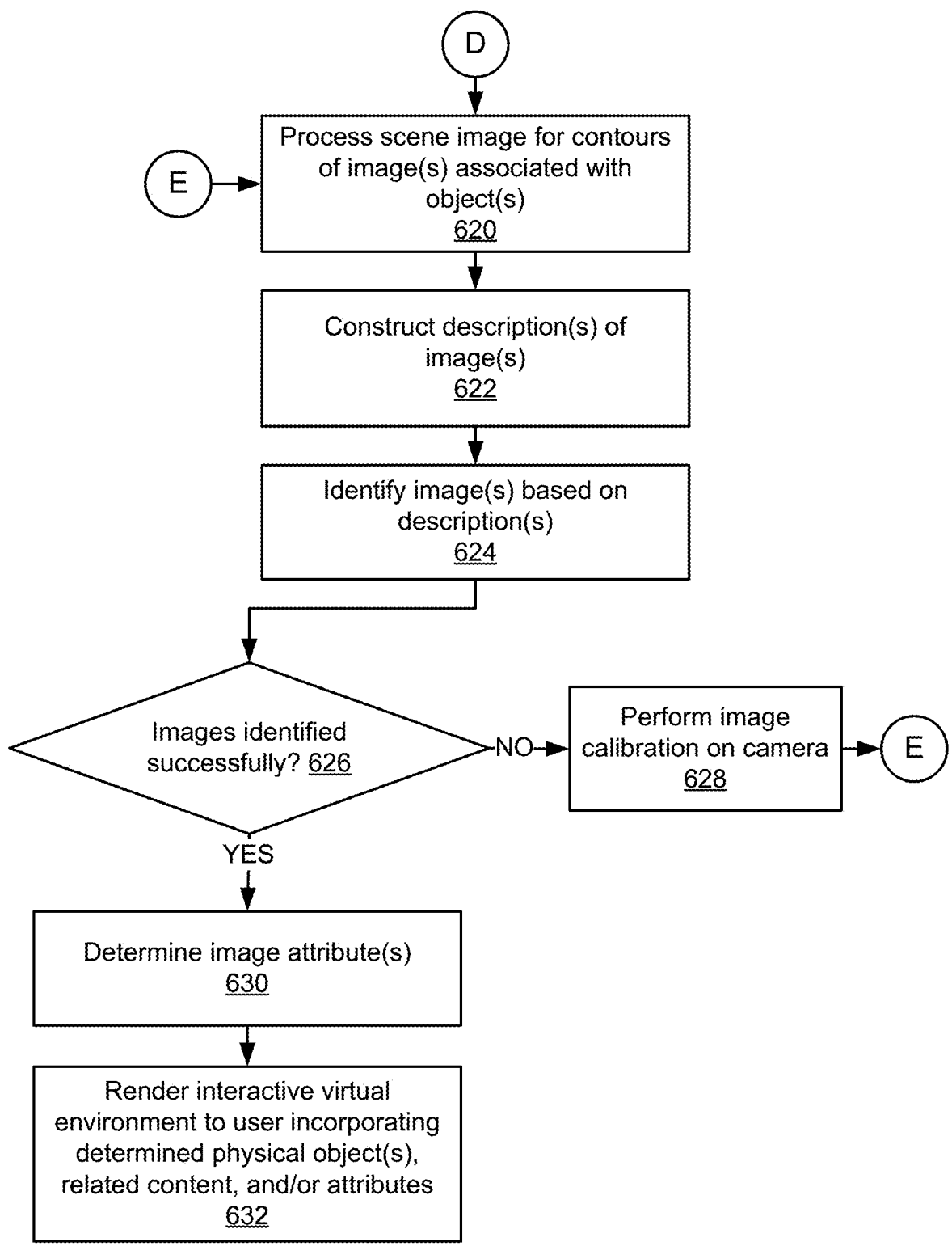

FIGS. 6A and 6B are flowcharts of an example method 600 for tangible interface object detection and recognition. In the method 600, the detector 304 may receive 602 an image of the activity scene 116, process 604 the image for the contour(s) of each TI object included in the activity scene 116, construct 606 an object description for each TI object based on the contour(s), infer 608 an object shape for each TI object based on the object description associated with that TI object, and identify 610 generally what each TI object is (e.g., a tile, card, block, game piece, writing utensil, toy, pad of paper, drawing, etc.) based on its inferred shape. FIGS. 5A-9 describes various further example operations that can be performed by the detector 304 to detect the TI object(s), although additional and/or alternative operations are also possible and contemplated.

In some implementations, an activity application 214 may specify the shape(s) of the TI object(s) (either directly or in the storage 310) that the detector 304 should look for when performing the object detection and identification, and the detector 304 may compare the specified shape(s) to those it infers from the video data to determine what the TI object(s) are. In other implementations, the detector 304 may infer the shape(s) of the TI object(s) and query a search engine operable by the server 202 or another information source (e.g., the storage 310) to determine what the TI object(s) are.

Next, the detector 304 may determine 612 a confidence in the identification of the TI object(s) and then determine 616 whether these confidence level(s) determined in block 614 meet a predetermined threshold. If not, the detector 304 may signal the calibrator 302 to calibrate 618 the camera 110 to account for the geometry of the visualization platform. Upon calibrating the camera 110, the method 600 may return block 602 and resume from there. If the detector 304 determines 616 that the confidence level(s) meet a predetermined threshold, the detector 304 processes 620 characteristics of the TI object(s) to determine the specific identities of the TI object(s).

In some implementations, the TI object(s) include image(s) (e.g., photos, pictures, graphics, etc., of various items) and the detector 304 processes 620 the contour(s) of these image(s), constructs 622 description(s) for the image(s) based on the contour(s), and then identifies 624 the image(s) based on their description(s). For instance, to identify that a TI object is a card depicting an image of a tree (e.g., see FIGS. 1A-1C), the detector 304 can process the region of the activity scene image that includes the TI object to construct contours for tree, create a description of the tree based on the contours, and query the storage 310 for a record matching the description.

In some implementations, the TI object detection operations performed in blocks 602-614 may serve to identify the general nature of the TI object(s), such as what type of objects they are (e.g., round cards, square cards, triangular cards, etc.), and the TI object recognition operations performed in blocks 620-624 may serve to determine the specific identities of the TI object(s) based on unique characteristics (e.g., a unique picture depicted on a visible surface of the TI object) that differentiate the TI object(s) from one another.

Next, the detector 304 proceeds to determine 620 whether it successfully identified the characteristic(s) (e.g., image(s)) of the TI object(s). If not, the detector 304 may signal the calibrator 302 to calibrate the camera for image recognition in block 628, and upon doing so, the method 600 may return to block 620 and resume from there. If the detector 304 determines 626 that the characteristic(s) (e.g., image(s)) of the TI object(s) are successfully identified, the detector 304 may determine 630 attributes for the images depicted on the TI object(s). One or more of the activity applications 214 may use the attributes of the TI object(s) and the images they contain (e.g., based on the events received from the detector 304) to render 632 an interactive virtual environment to the user that incorporates digital representations of the TI object(s), content related to the TI object(s), and/or the environmental and/or positional attributes of the TI object(s), as described elsewhere herein.

Figure 7:
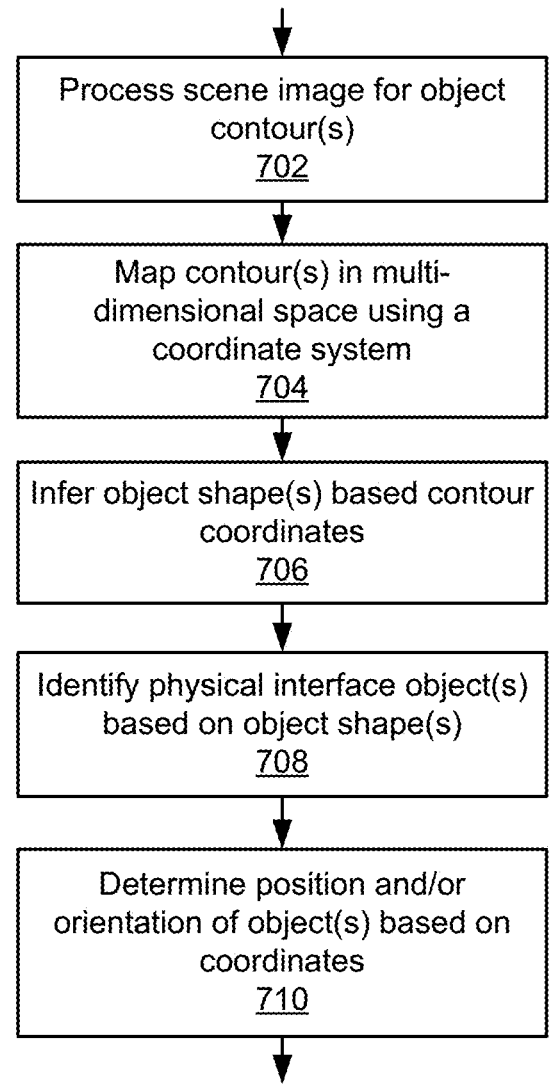
FIG. 7 is a flowchart of a further example method for tangible interface object detection.
Figure 8:
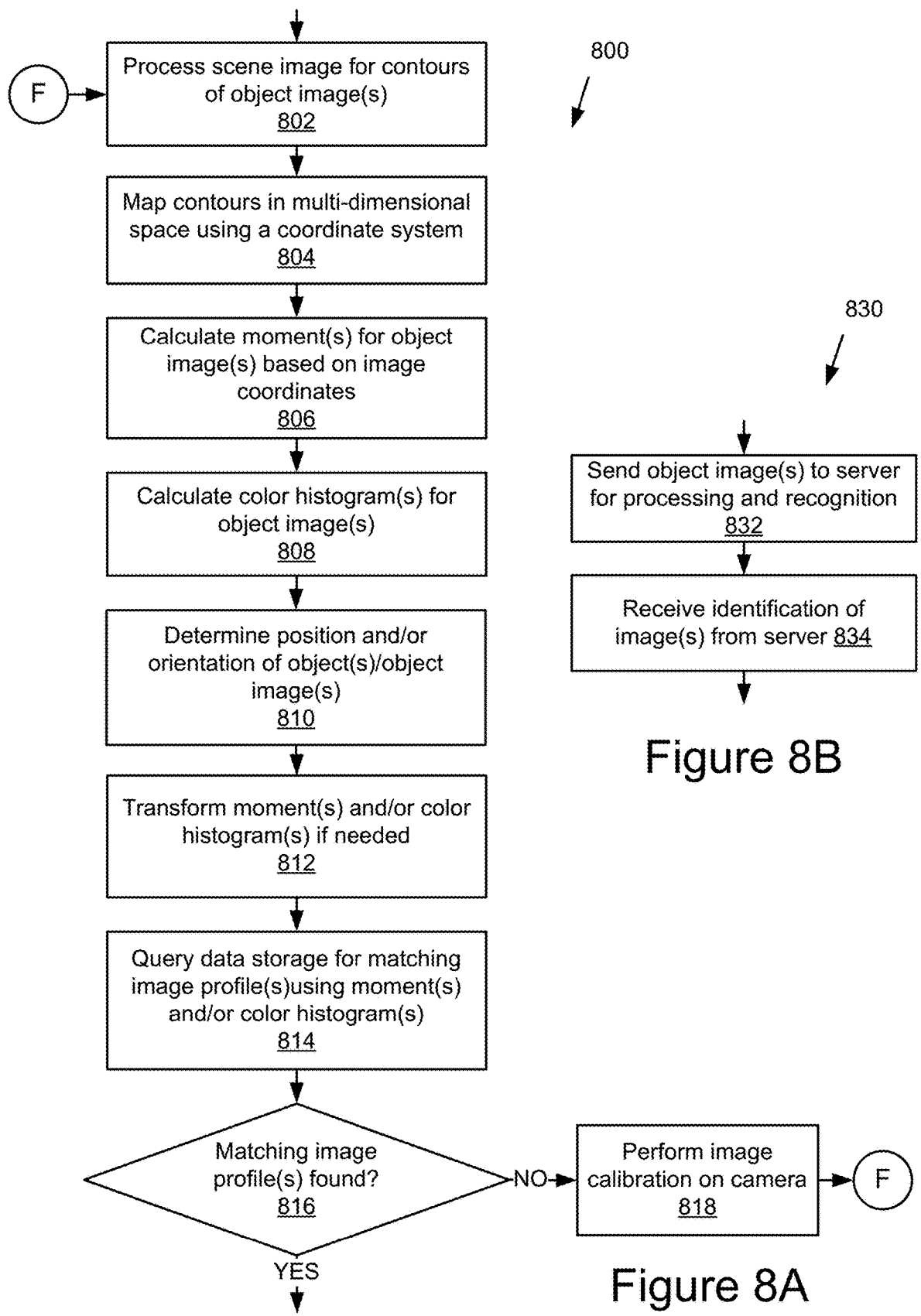
FIGS. 8A and 8B are flowcharts of a further example method for tangible interface object recognition.

FIG. 7 is a flowchart of a further example method 700 for TI object detection. In block 702, the detector 304 may process the video image of the activity scene 116 for contour(s) of each TI object included in the activity scene 116 and construct 704 a description for each TI object by mapping the contour(s) associated with each of the TI objects using a coordinate system. The detector 304 may then infer 706 the object shape for each TI object based on the coordinates of the contour(s) associated with each TI object, identify 708 the TI object(s) based on the object shape(s) of the TI object(s), and determine 710 the position and/or orientation of the TI object(s) based on the coordinates of those TI object(s). For example, the detector 304 may use the coordinates of the contours of the objects to determine the position and/or orientation of the objects. In some cases, the detector 304 may compare the coordinates with a known point of reference (e.g., the stand 106, positional information associated with the TI objects stored in the storage 310, etc.) to determine the position and/or orientation of the objects.

FIGS. 8A and 8B are flowcharts of a further example method 800 for TI object recognition. In block 802, the detector 304 may process 802 the video image of the activity scene 116 for contour(s) of image(s) contained on the TI object(s) and construct 804 description(s) for the object image(s) by mapping the contour(s) associated with the image(s) using a coordinate system. The coordinate system may be two or three dimensional in nature and may be configured to reflect the dimensions (scaled or actual) of the activity scene 116, and thus the position of the TI object(s) when mapped by the detector 304. Next, the detector 304 may calculate 806 moment(s) for the object image(s) based on the mapped coordinates associated with the image(s). Example moments that can be calculated by the detector 304 may include area moments, perimeter moments, centroid moments, etc. These moments may be calculated based on the areas, perimeters, etc., of the items depicted by object images of the TI object(s). As a further example, the detector 304 may use the coordinates of the contours for the items it processes from the object images to determine perimeters or areas for those items, and may then compute various moments as unique identifiers for the images using the perimeters or areas. In some instances, the detector 304 may manipulate various parameters of the camera to adjust the video images being captured (e.g., contrast, exposure, white balance, levels, etc.) to enhance the contours of the items depicted by the object images.

Alternatively or in addition to block 806, the detector 304 may calculate 808 color histogram(s) for the object image(s) as unique identifiers for the image(s). The color histogram(s) may be computed based on the entire image or one or more sections thereof. For instance, the detector 304 may divide the image contained on a given TI object using a grid and may compute color histogram(s) for using the image data from one or more quadrants of the grid. As a further example, the grid may be a 4×4 grid that overlays the image containing 16 quadrants and the detector 304 may compute three color histograms using image data from the $1^{st}$, $5^{th}$ and $6^{th}$ quadrants (e.g., counted left to right, top to bottom), respectively. This is advantageous as each image may be indexed using different attributes extracted from different regions of the object image, thus allowing the platform to index more than one attribute.

The detector 304 may determine 810 positional information for the TI object(s), such as location and/or orientation of the TI object(s) within the activity scene 116 based on the object and/or image coordinates. The detector 304 may also determine 812 whether to transform the moments and/or histograms computed in blocks 606 and/or 808 and may then query 814 the a data store, such as storage 310, for matching records (e.g., image profiles) using the moment(s) and/or color histogram(s). In some instances, the moments and or histograms may be transformed based on the position of the TI object(s) within the activity scene 116 (e.g., relative to a point of reference, such as the stand 106).

If matching image profiles are found 816 by querying the data store, the detector 304 may generate events for the TI object(s) based on attributed information determined by the detector 304 and/or retrieved from storage 310, as discussed in further detail elsewhere herein. If matching image profiles are not found in block 816, the detector 304 may signal the calibrator 302 and/or the user to perform 818 image calibration on the camera, and once performed, the method 800 may return to block 802 and resume processing from there.

In some implementations, to recognize the object images in method 800, the detector 304 may perform the operations of method 830 by sending 832 the object image(s), and/or information computed based on the object images, such as the moments and/or color histogram, to a server 202 coupled to the network 206 for processing and recognition. In response, the detector 304 may receive 834 identification of the image(s) from the server 202. In some cases, the server 202 may include an image search engine capable of matching the object image(s), and or information derived therefrom, to images accessible on the Internet and determine the identities of the object images based on metadata and/or information associated with the Internet images. The search engine may provide the detector 304 with digital representations of the TI object(s) (and/or information supplemental thereto) retrieved from Internet-based information sources (e.g., websites), and the detector 304 may store and/or provide this information to one or activity applications 214 for use thereby in generating a virtual environment that incorporates the TI object(s). In some implementations, one or more of these operations may be performed by an activity application 214.

Figure 9:
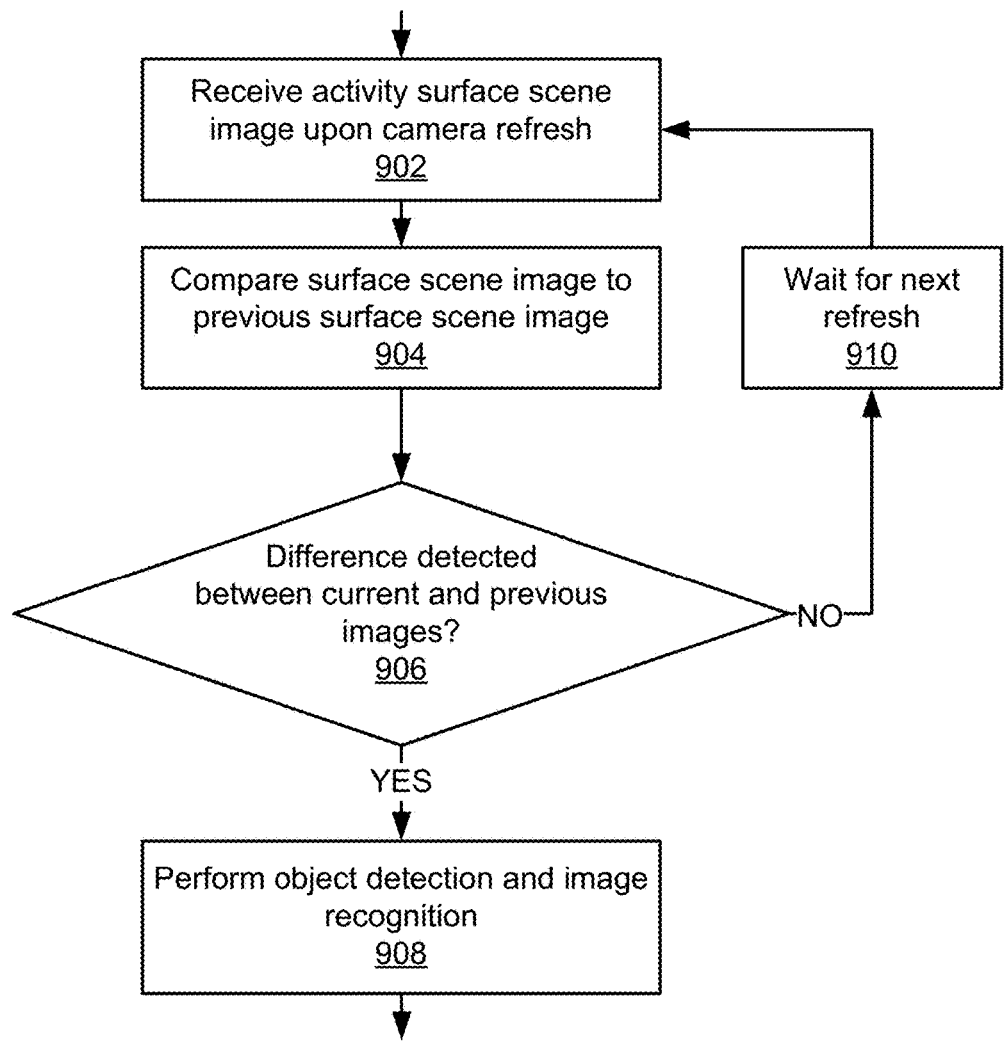
FIG. 9 is a flowchart of an example method for detecting changes in the state of an activity surface.

FIG. 9 is a flowchart of an example method 900 for detecting changes in the state of an activity surface.

In block 902, the detector 304 may receive a video image frame of the activity scene 116, compare 904 the activity scene image to a previously received image frame of the activity scene 116, determine 906 whether a substantial difference exists between the image frame of the activity scene 116 and the previously received image frame of the activity scene 116, and proceed in block 908 to process the video stream to detect the one or more interface objects included in the activity scene 116 if the substantial difference is determined to exist. If in block 906, a substantial difference is not detected between the current and previous states of the activity scene 116, the method 900 may wait 910 for the next image frame and then repeat the operations in at least blocks 902, 904, and 906.

By using the method 900, the detection engine 212 may wait for the next video image that actually contains a significant enough change to justify processing the image for TI object(s). As a further example, during each cycle, the detector 304 may compare a previous and subsequent video image to determine if there are any significant changes and may refrain from processing the most recent image unless the changes satisfy a predetermined threshold. The method 900 is advantageous because it can eliminate unnecessary detection and recognition processing by the platform and thereby avoid bogging down/adversely affecting the performance of the computing device 104.

Figure 10:
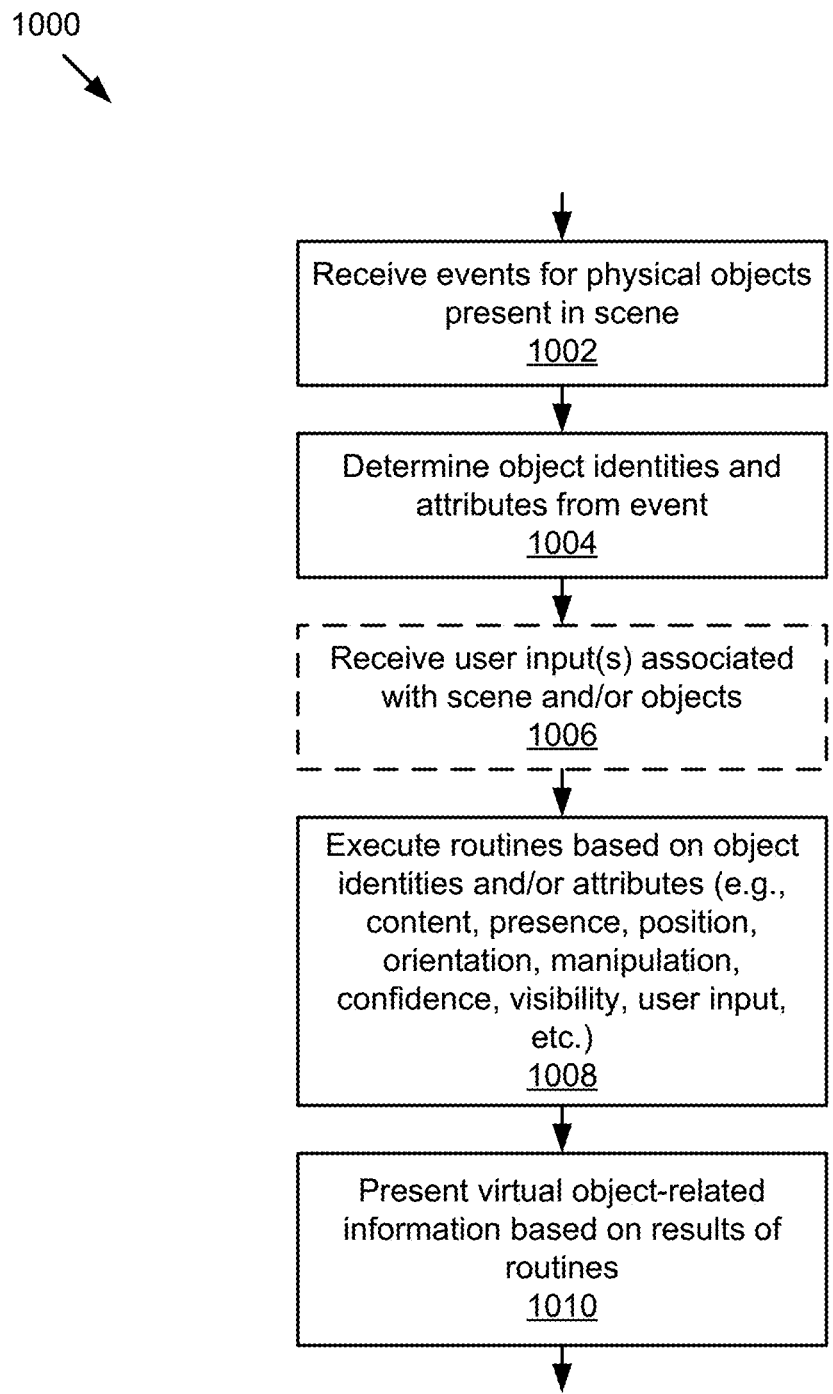
FIG. 10 is a flowchart of an example method for processing and displaying virtual object-related information based on the interface objects identified.
Figure 11A:
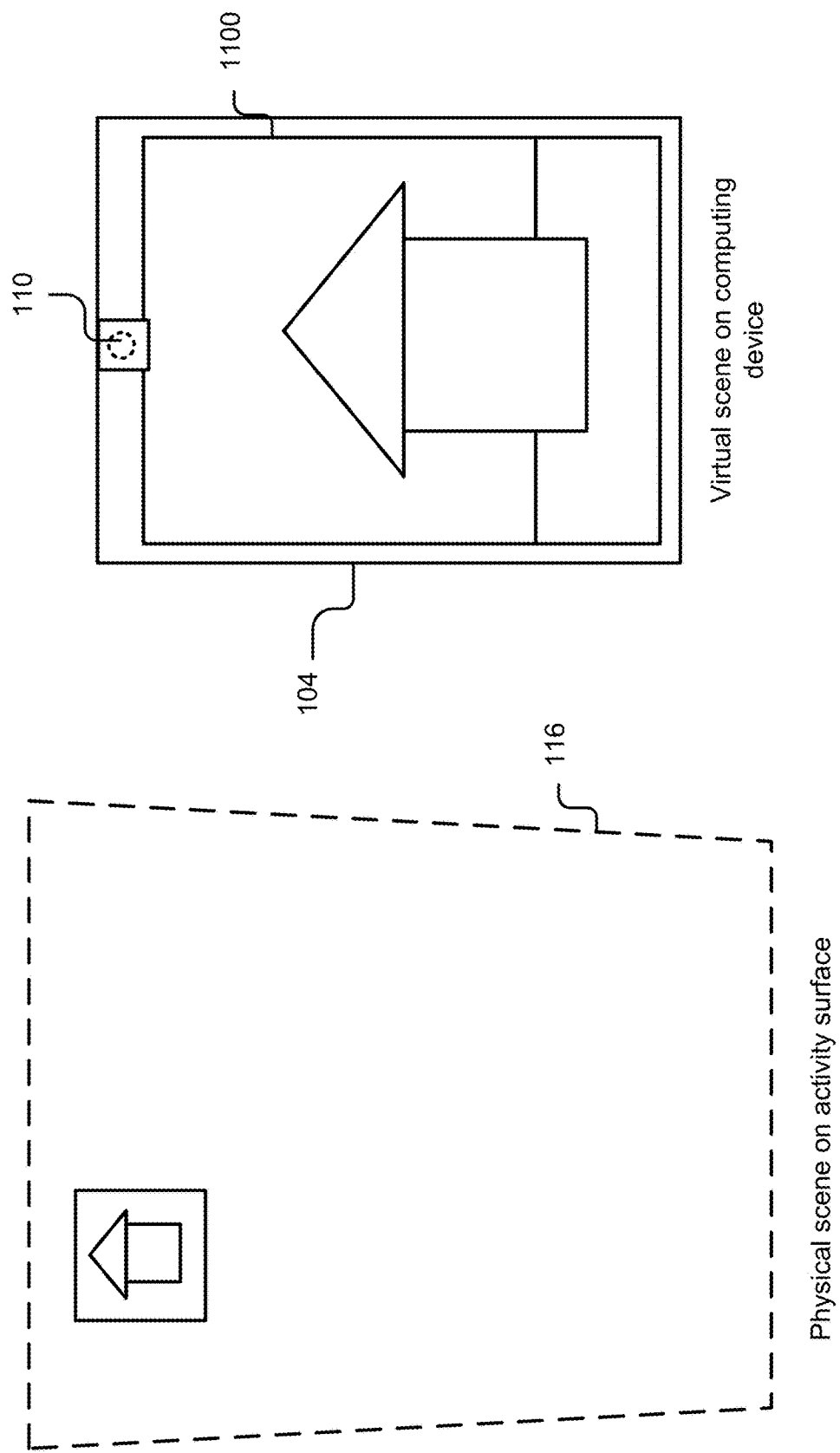
FIGS. 11A-14 are examples of virtualized scenes on a computing device generated based on physical scenes created by users on a physical activity surface.
Figure 11B:
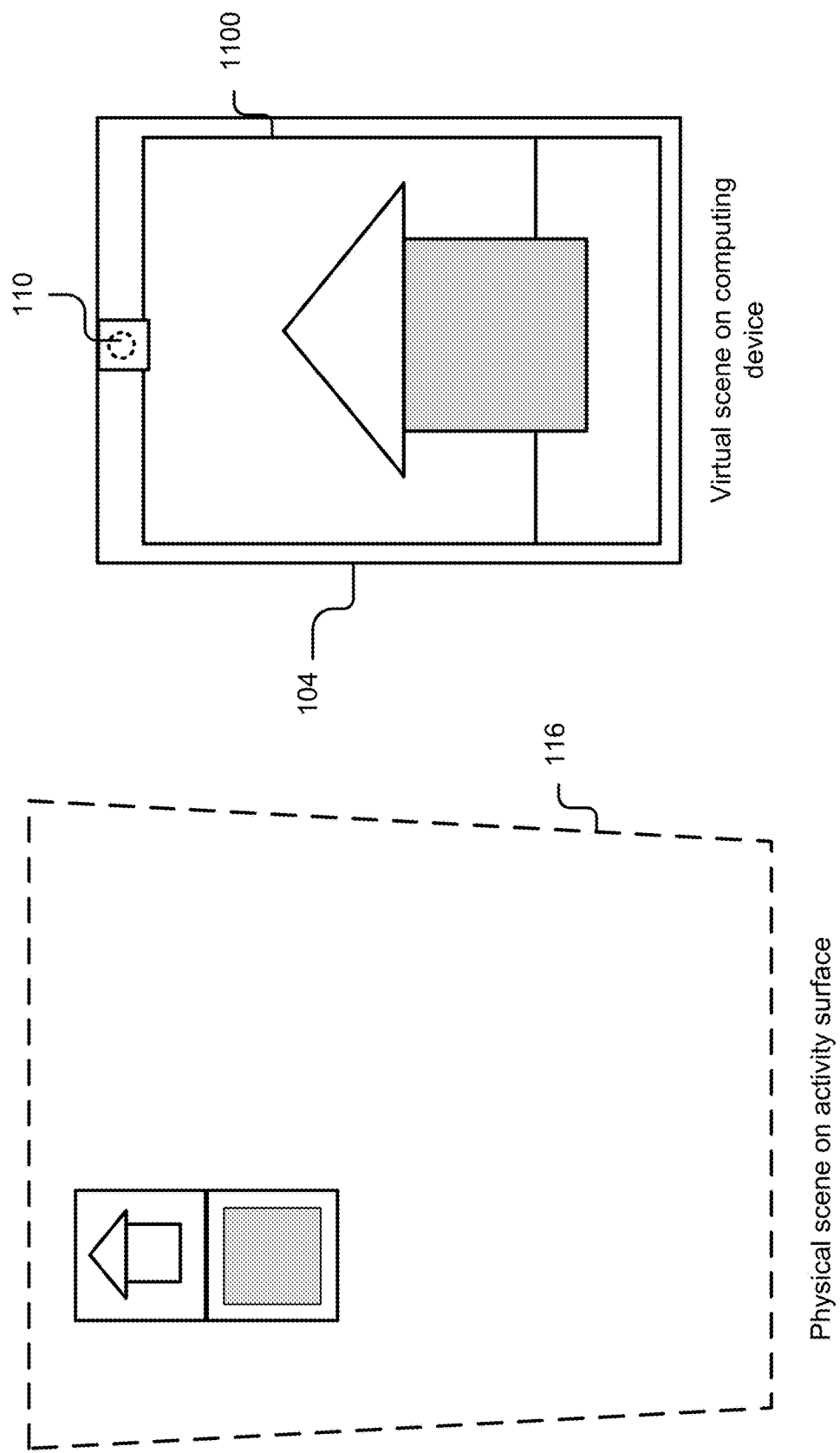
Figure 11C:
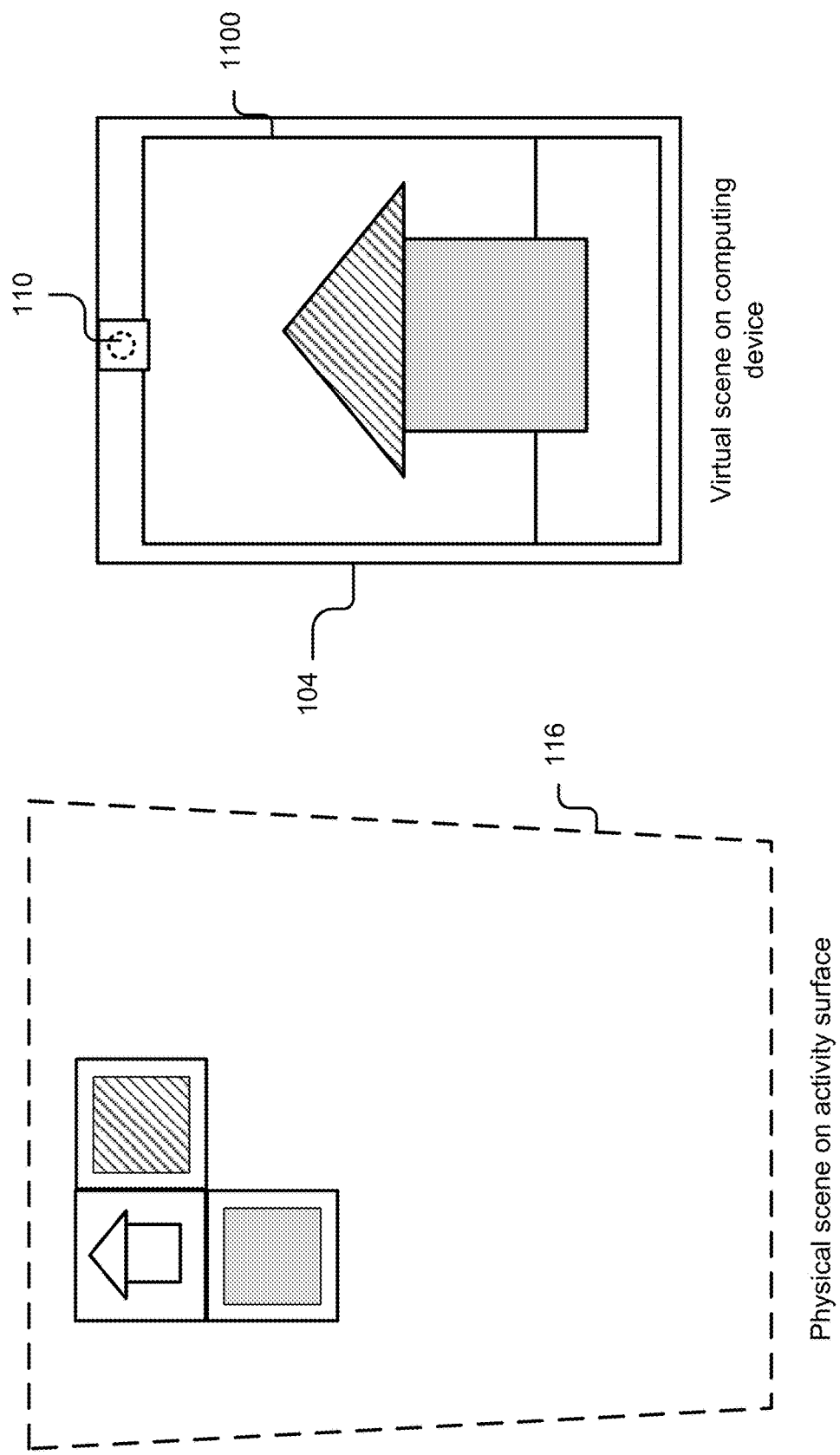
Figure 11D:
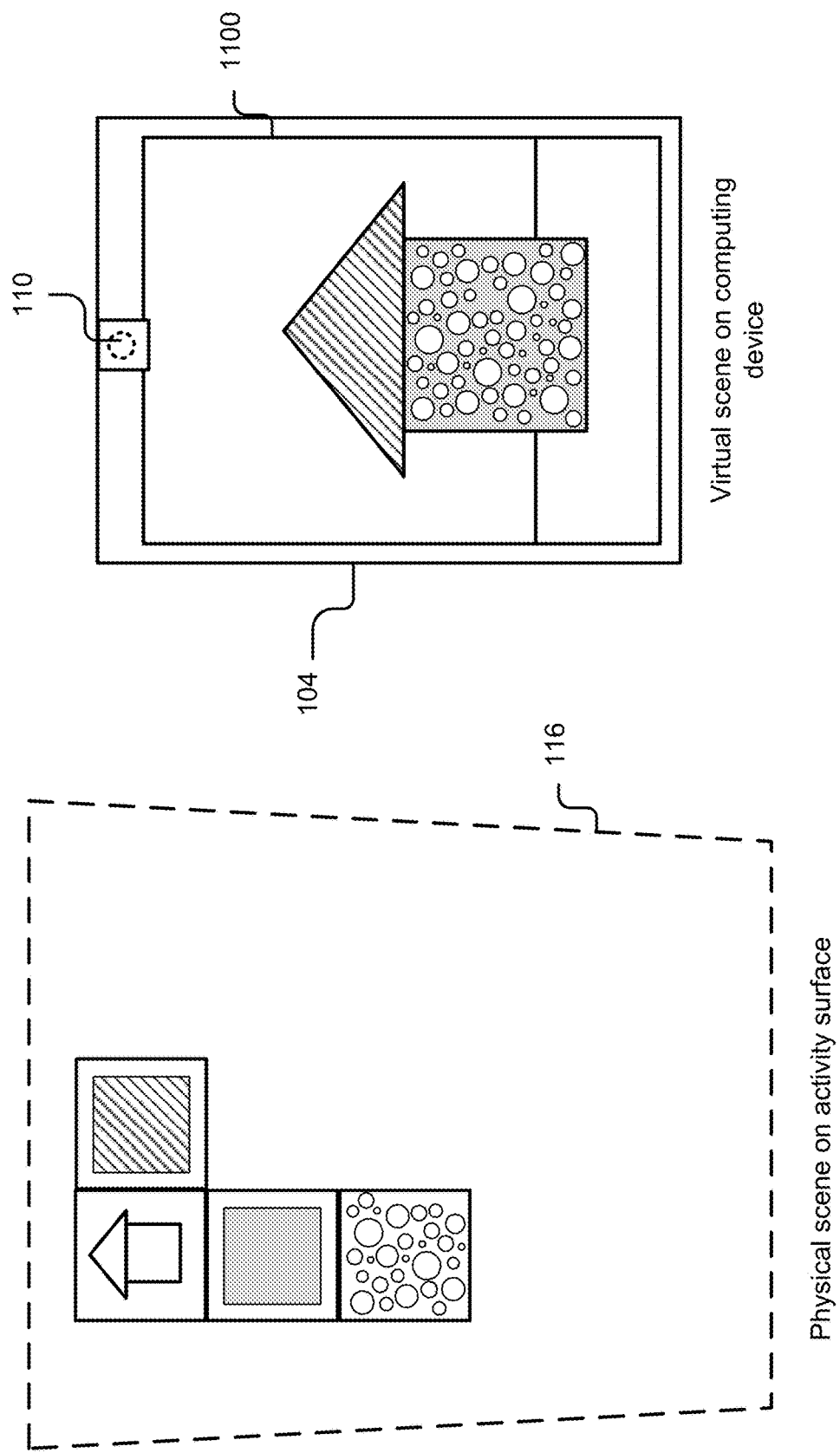
Figure 11E:
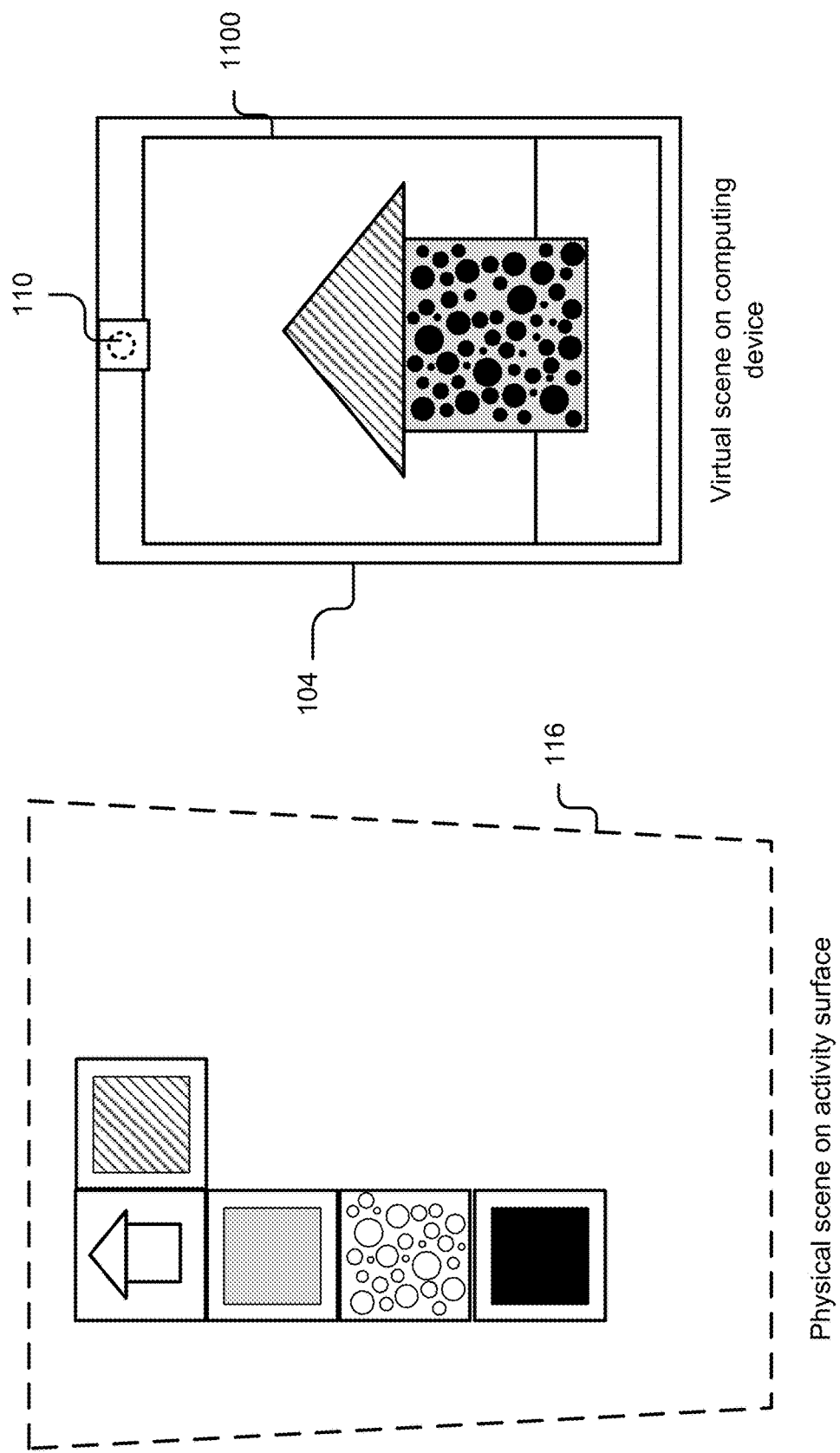
Figure 11F:
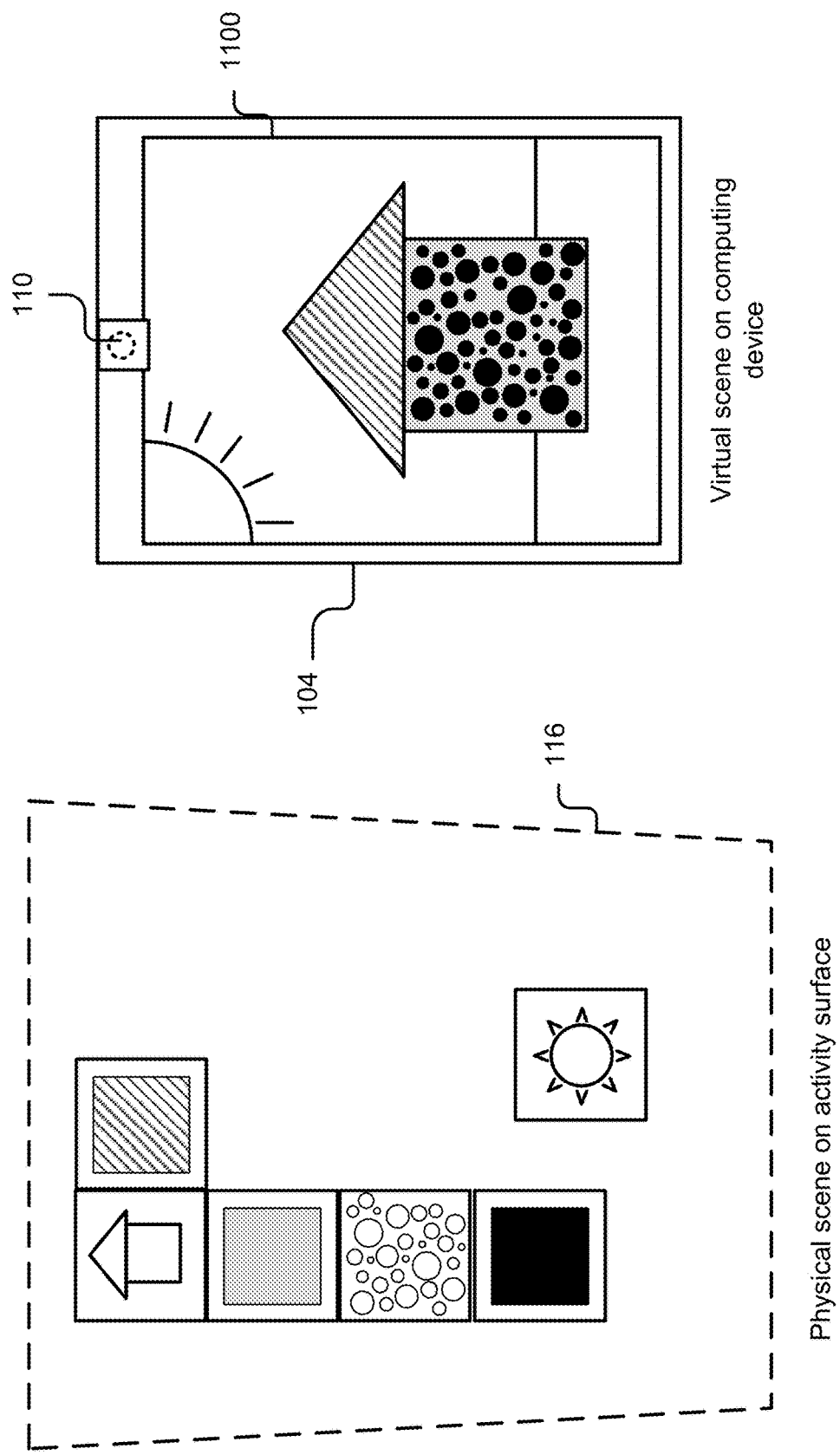
Figure 11G:
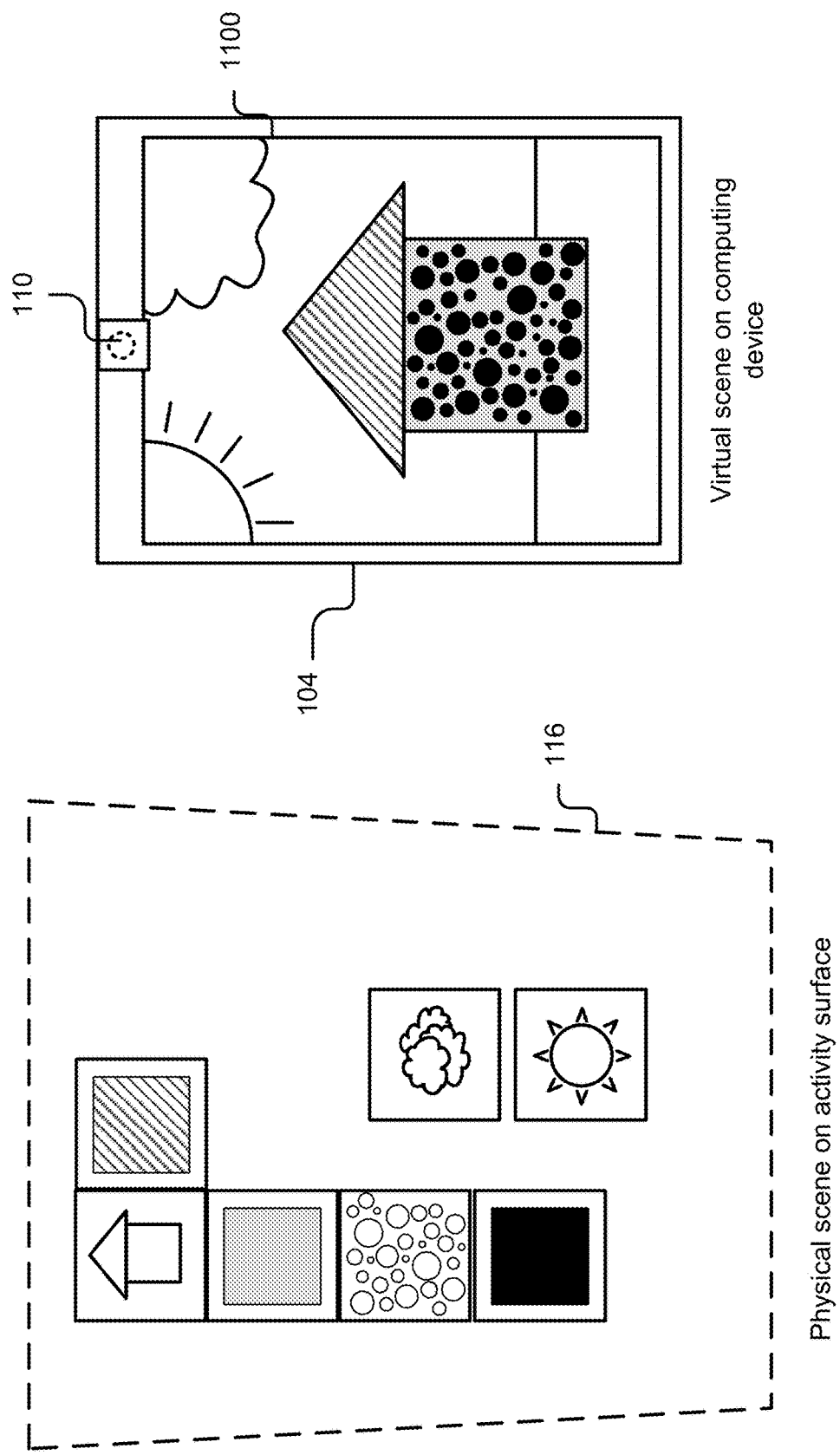
Figure 11H:
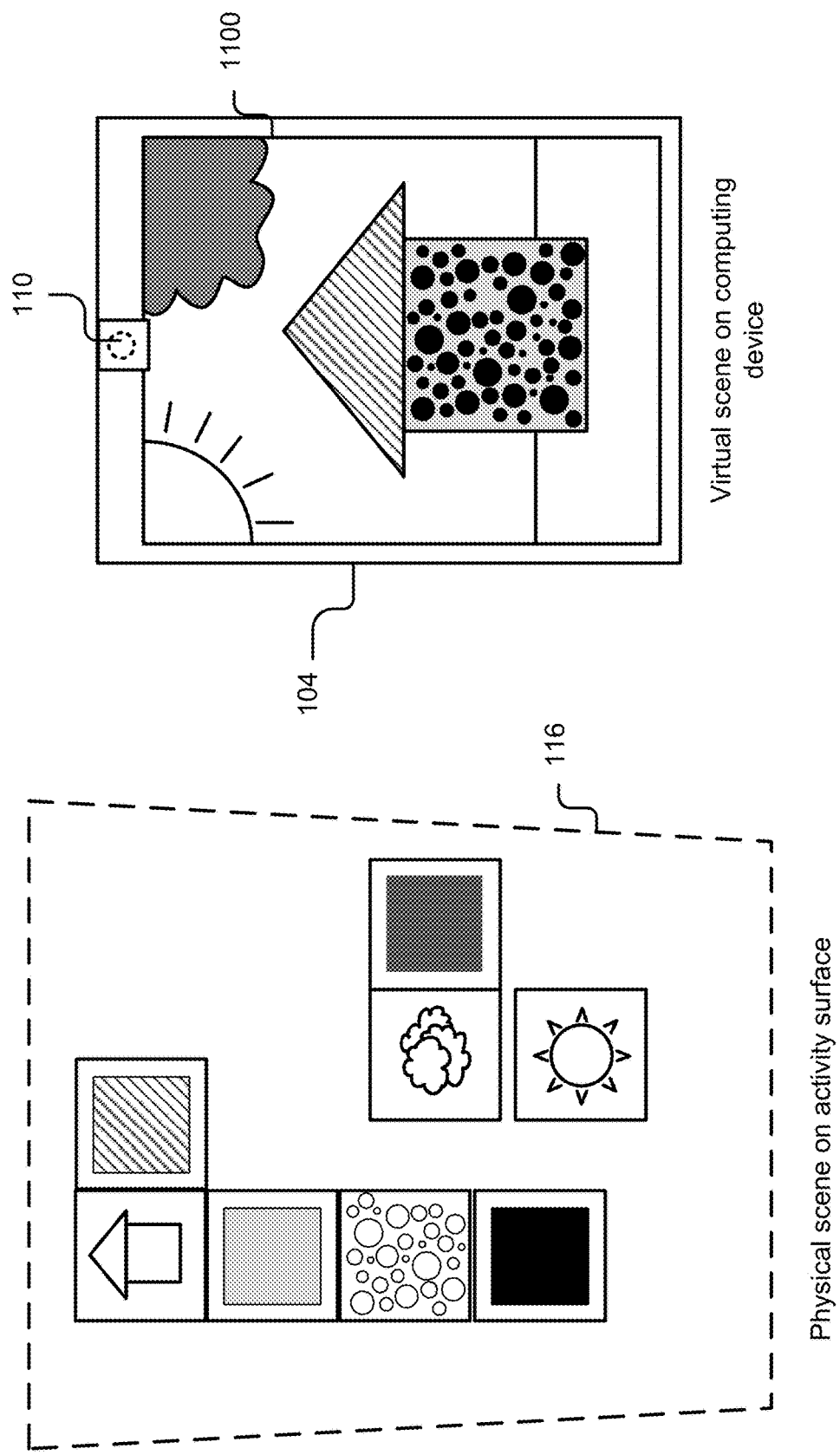
Figure 11I:
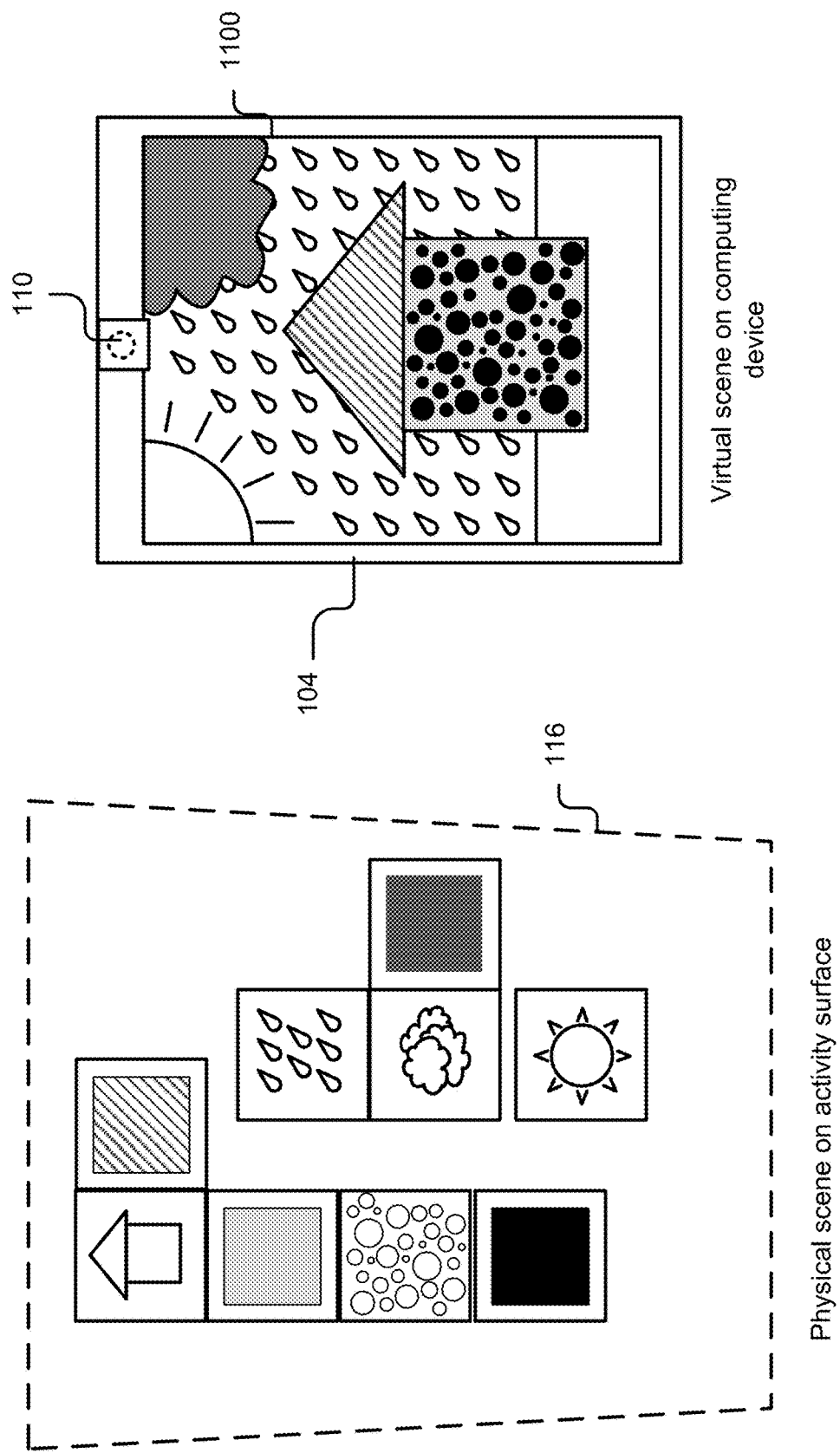

FIG. 10 is a flowchart of an example method 1000 for processing and displaying virtual object-related information based on the TI object(s) identified. In block 1002, an activity application 214 may receive event(s) for the TI object(s) determined by the detector 304 as present in the activity scene 116. Based on information included in the one or more events, the activity application 214 may determine 1004 the identities of the TI object(s), receive 1006 one or more input(s) associated with the activity scene 116 and/or TI object(s), such as gestures determined from the event(s) provided by the detector 304, gestures derived from information included from event(s) received over time, user input(s) detected from a user scene 126 by the detector 304, etc., user input(s) received from the user via the input device 318 of the computing device 104, etc.

Based on the identities and attributes of the TI object(s), the activity application 214 may then execute 1008 one or more routines to generate object-related information visualizing the one or more interface objects and may present 1010 the object-related information to the user, as discussed elsewhere herein.

It should be understood that the each of the methods 400-1000 are in many respects compatible with and in some cases expansions one or more of the other methods, and that further methods based on the combination of various aspects of these methods are contemplated and within the scope of the present disclosure.

In addition, the methods 400-1000 are advantageous in a number of respects including, but not limited to, providing fast and accurate TI object detection and recognition, providing the user with a real-time, virtualized experience that blends the user's physical interaction with the TI objects and activity surface 102 and rich, visual and computational enhancements that would otherwise be inaccessible to the user, and adding a meaningful tangible aspect to what can otherwise be a tactile-less, largely sterile digital experience.

FIGS. 11A-14 are examples of virtualized scenes on a computing device 104 generated based on physical scenes created by users on a physical activity surface. In particular, FIGS. 11A-11I depict a series of incremental changes to a physical activity scene 116 on a physical activity surface, which are replicated in a virtual scene 1100 on a computing device 104. In these figures, each cluster of tiles represents a logical construct that is processed by the activity application 214 to render a unique visual representation of the tiles derived from the content, manipulation, and/or relative position of the tiles. For instance, in FIG. 11A, a tile bearing an image of the house is placed in the activity scene 116 and a corresponding virtual scene 1100 that includes the house is rendered by activity application 214 for presentation on the computing device 104 based on the event generated for the tile by the detector 304. In subsequent FIGS. 11B-11E, additional tiles bearing different colors and patterns are adjacently and abuttingly placed in a cluster in the activity scene 116, and the activity application 214 analyzes the positions, alignments, and tile combinations, as determined by the detector 304, to compute the overall effect of the tile cluster. In this example, the tiles abutted to a lower side of the house tile are determined by the activity application 214 as having a serialized coloring and patterning affect that compounds to produce a colorized pattern for the main structure of the house. In contrast, since the tile including the lined texture is the only tile abutting the house tile on the right, the activity application 214 interprets the placement of this tile as an instruction to add that pattern to the roof of the house as depicted in the virtual scene 1100.

Further, in FIGS. 11F-11I, two more clusters of tiles are placed in the activity scene 116 (i.e., the sun cluster and the cloud cluster). As a result, the activity application 214 interprets the arrangement and content of each of these clusters to render a sun on the left side of the virtual scene 1100 and a summer storm including a dark cloud and rain. In particular, the sun is left unadorned as there are no tiles placed adjacent to the sun tile in the activity scene 116 and the cloud is colored dark gray and is shown as producing rain based on the arrangement of the tiles in the cloud cluster.

Figure 12A:
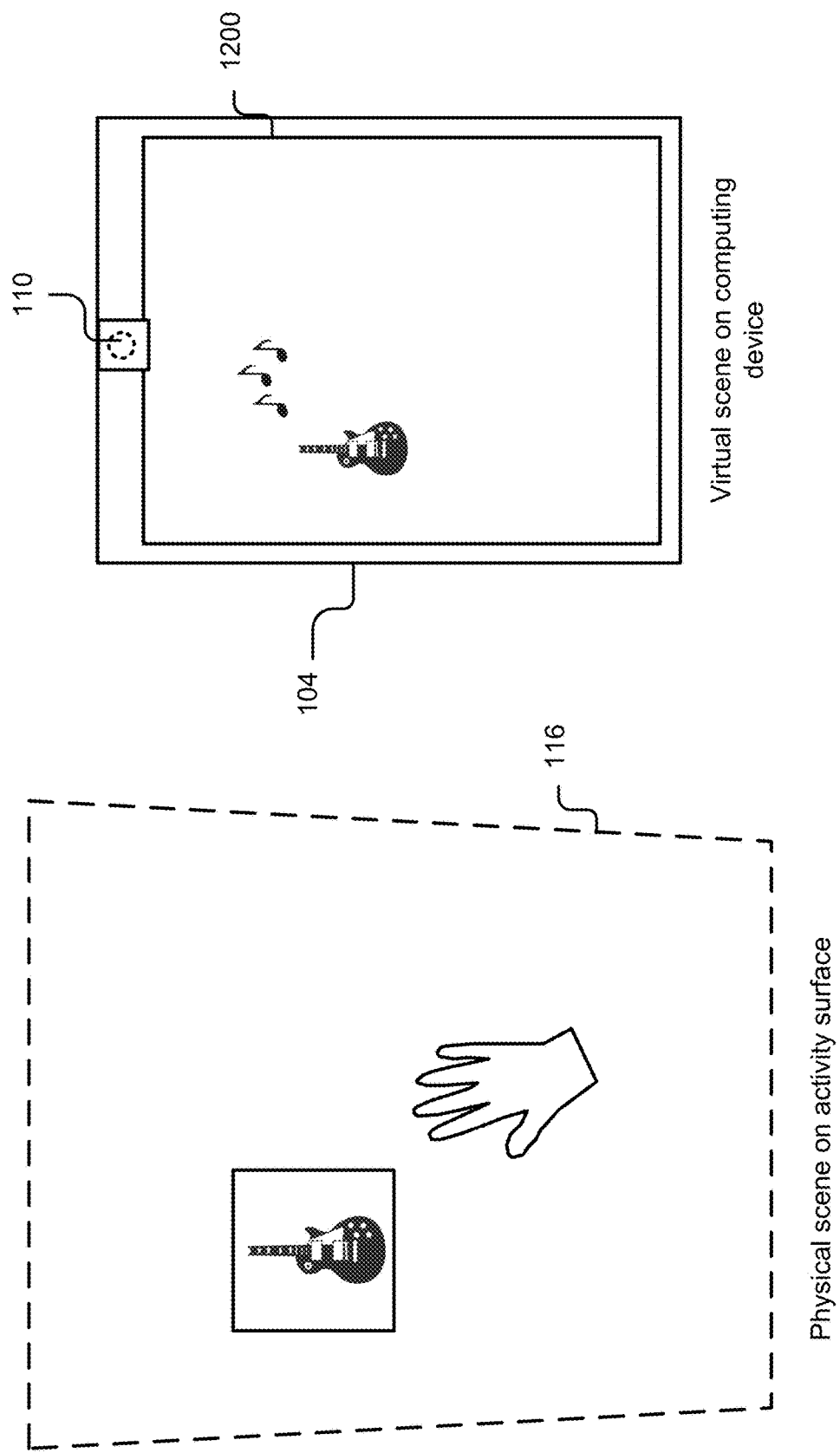
Figure 12B:
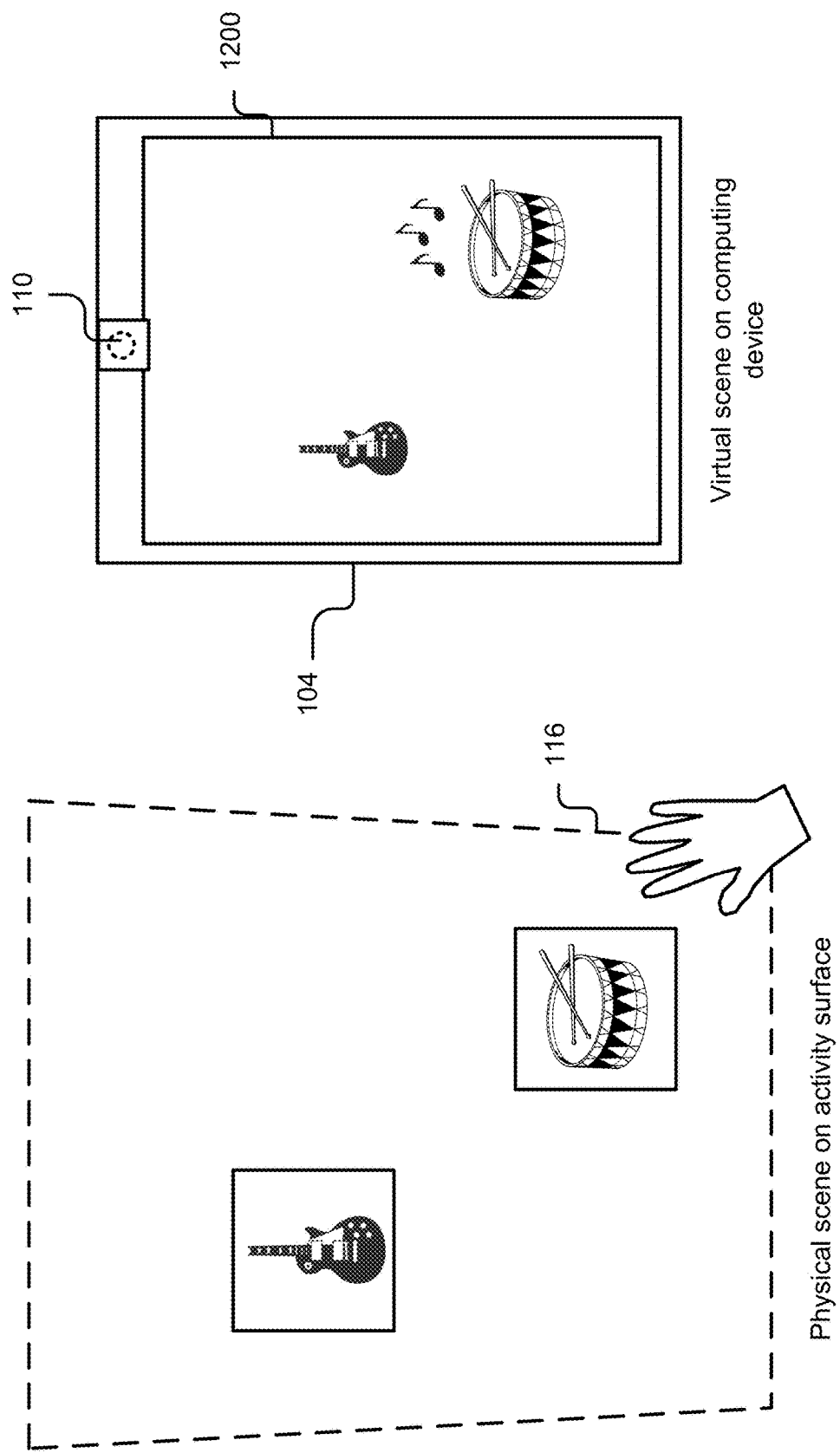
Figure 12C:
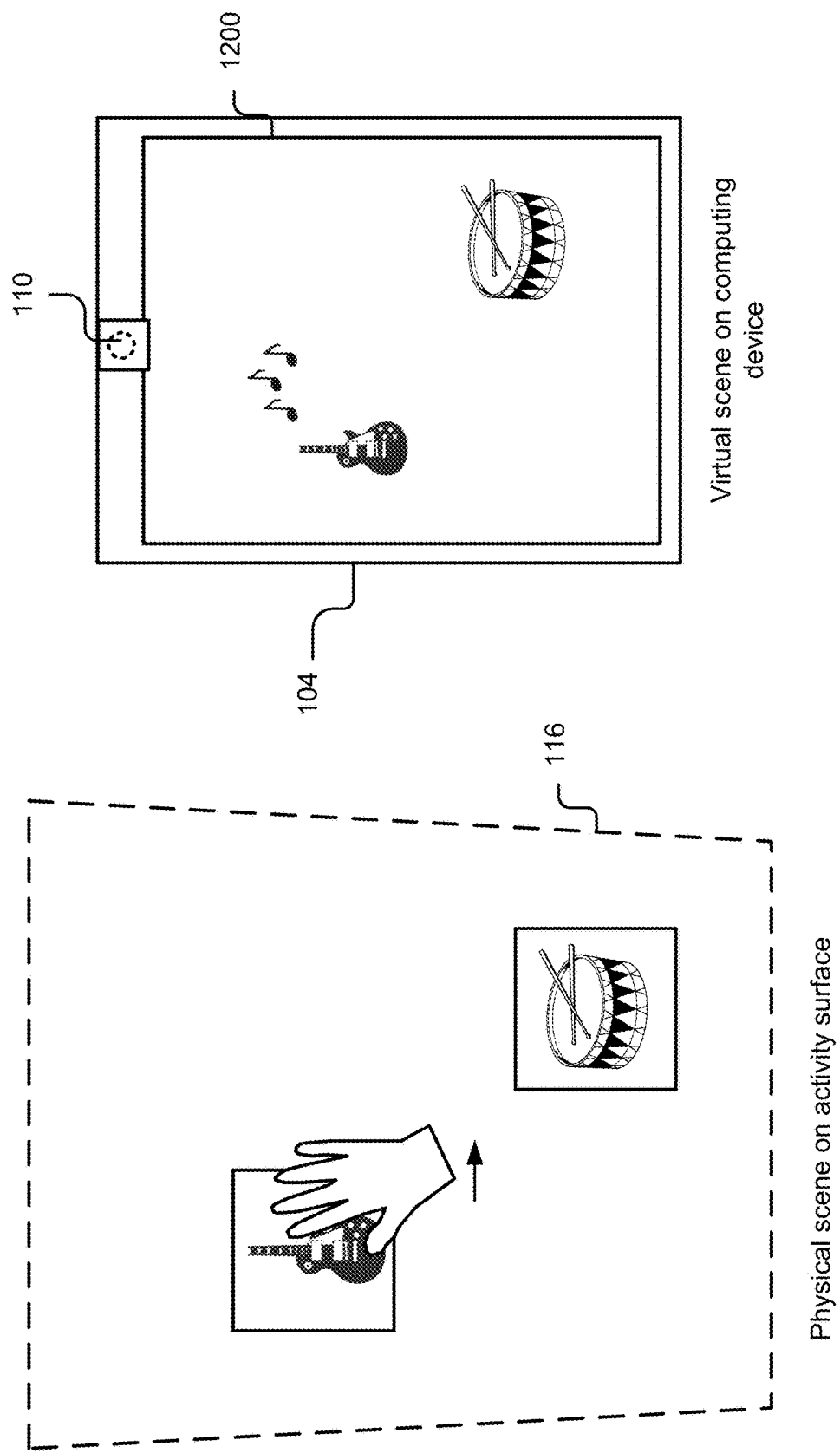

FIGS. 12A-12C depict an example music game. In this game, users can place tiles depicting different musical instruments in the activity scene 116 and the activity application 214 renders digital audio and visual representations of the instruments in the virtual scene 1200. Based on the user's interactions with the tiles, the activity application 214 can produce different sounds and visual effects for the instruments that are recognized. For example, in FIG. 12A, a guitar tile is place in the activity scene 116, the detection engine 212 detects the object as a tile, identifies the images as being a guitar, determines the position and orientation of the tile, and creates and provides an event describing the tile to the activity application 214. The activity application extracts the identity of the tile from the event and queries the storage 310 for a digital image of the guitar and a music file of a guitar sound, and then reproduces a digital representation of the tile in the virtual scene 1200 in a location that corresponds to the position of the guitar tile in the activity scene 116 and plays the music file of the guitar sound (as indicated by the notes depicted in the virtual scene 1200). Similarly in FIG. 12B, the user places a drum tile in the activity scene 116 and the activity application 214 renders a drum for display. The activity application 214 can also produce effects based on the manipulation of the tiles in activity scene 116, as shown in FIG. 12C. In this figure, the user waves his/her hand over the guitar tile, and in response, the detection engine 212 detects the obscure gesture associated with the guitar tile and generates and passes event(s) based thereon to the activity application 214, which may determine from the event(s) that the guitar tile has been obscured and render a guitar sound in response (e.g., via a speaker of the computing device 104).

Figure 13A:
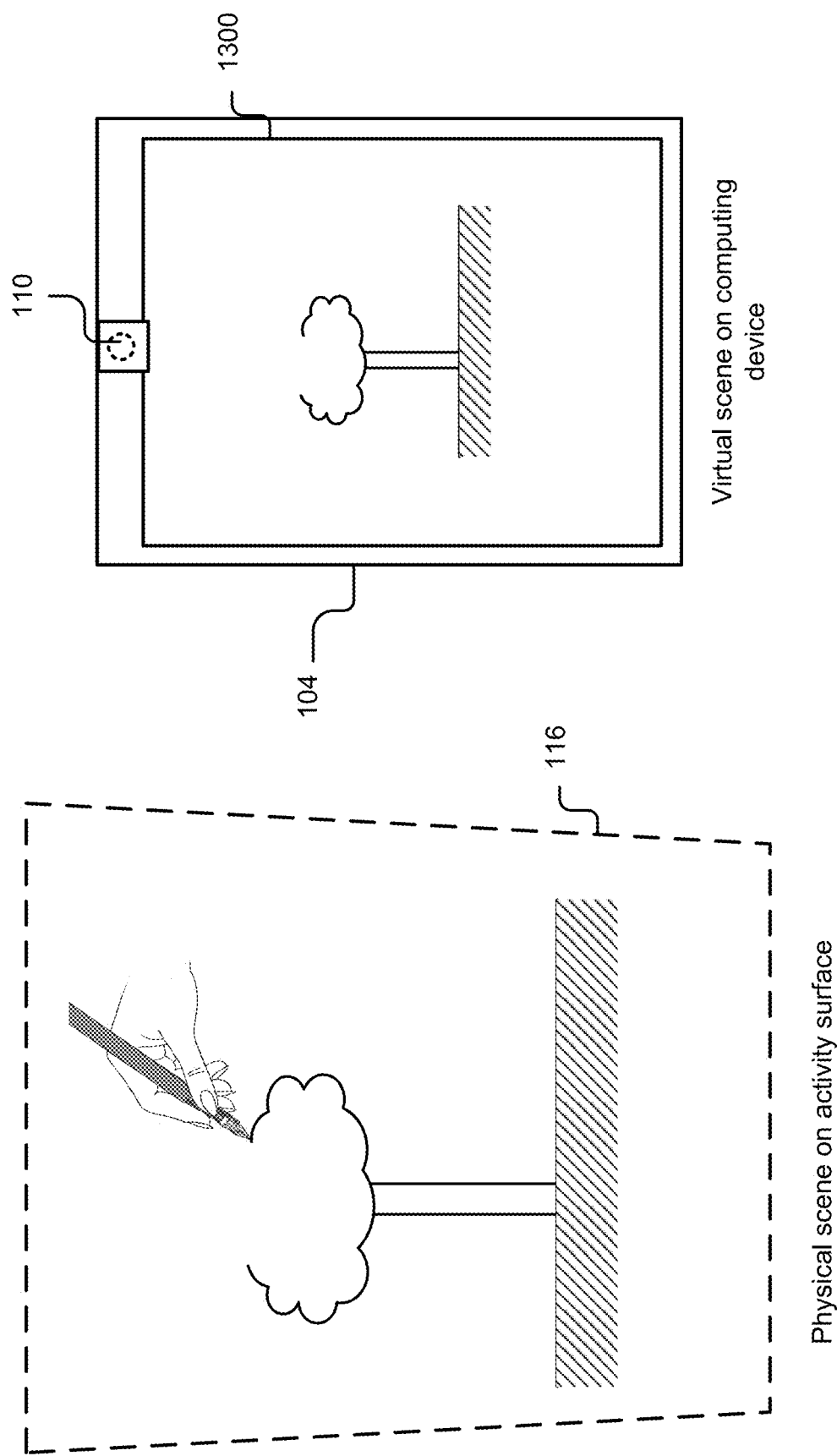
Figure 13B:
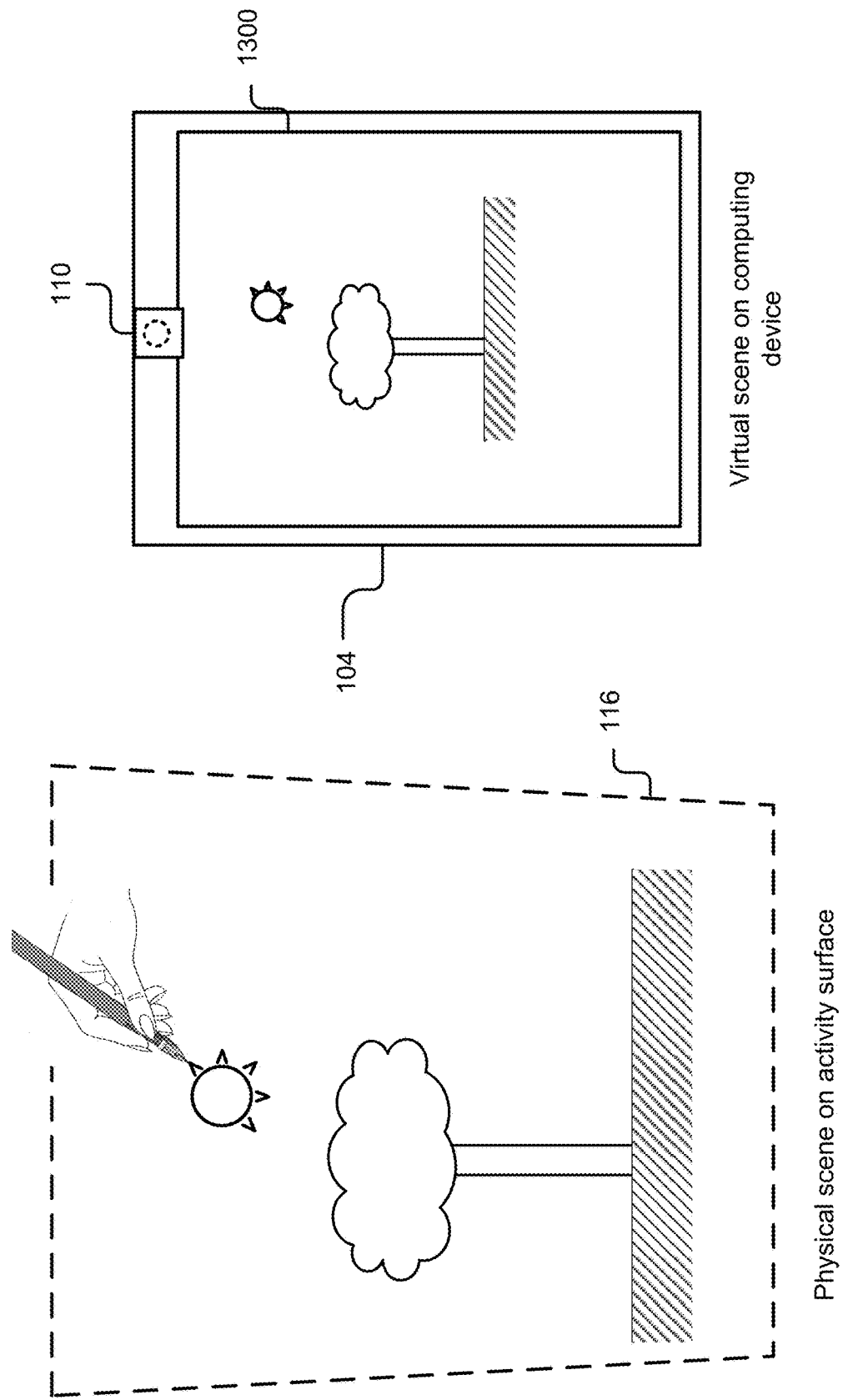
Figure 14:
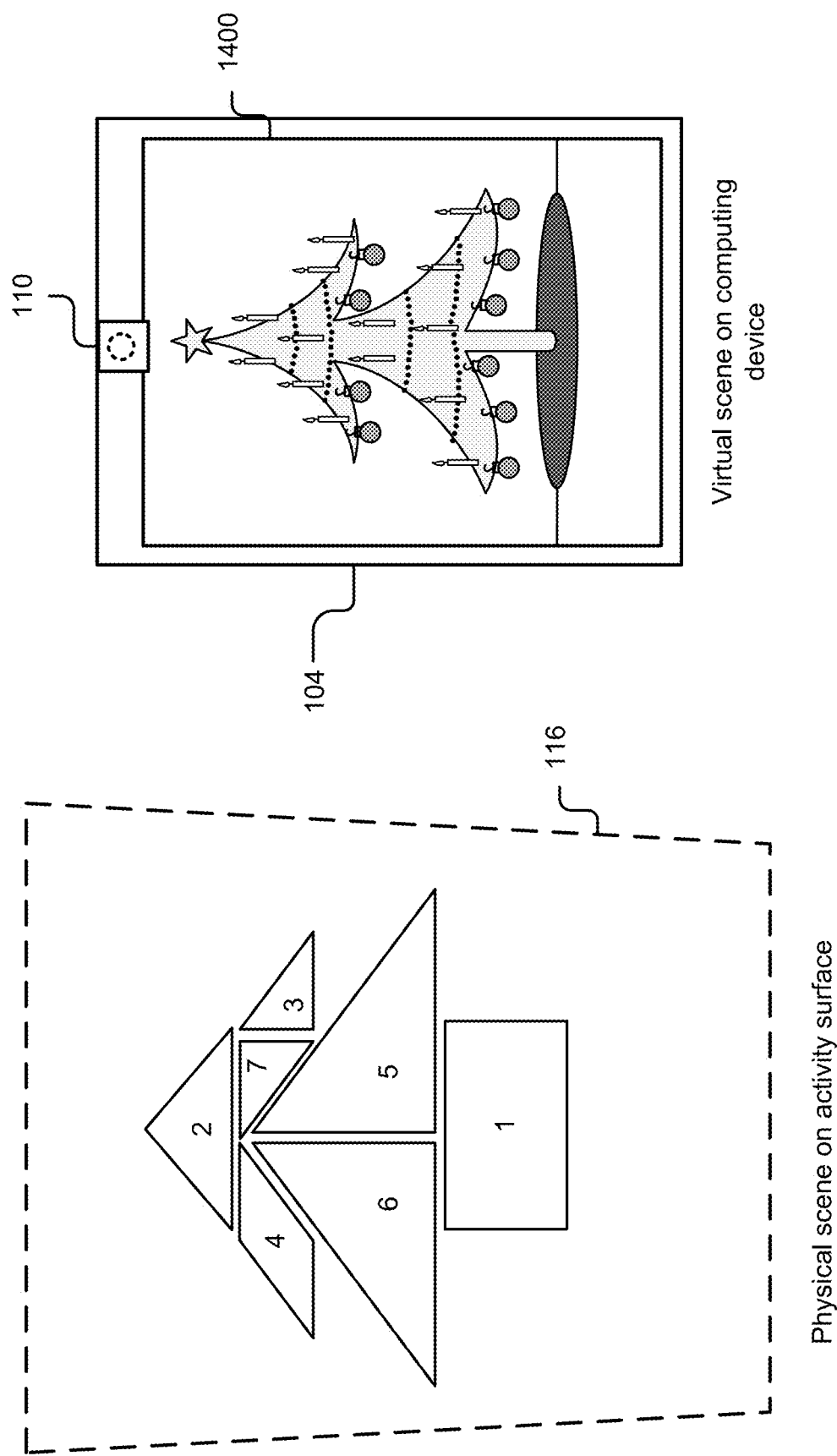
Figure 15:
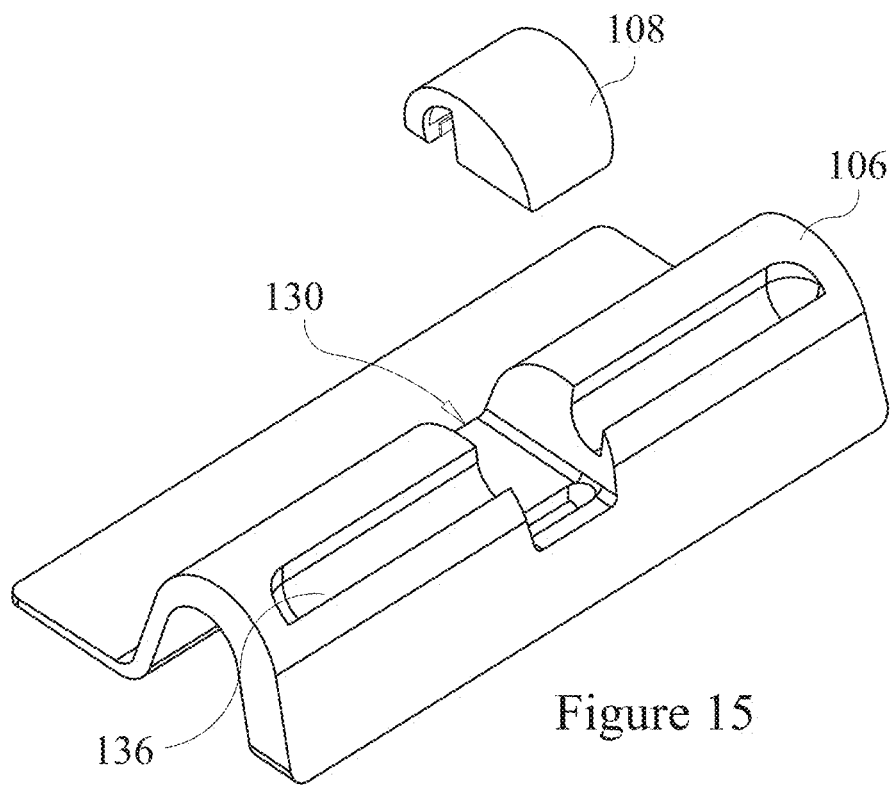
FIGS. 15-19 depict various views of an example adapter and stand for a computing device.
Figure 16:
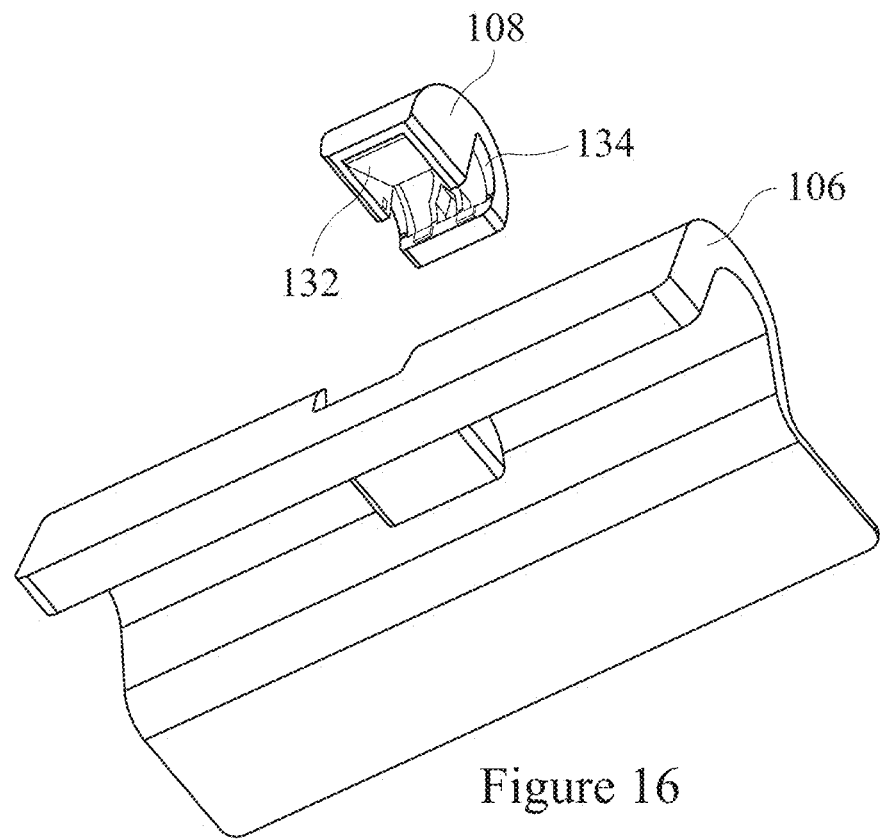
Figure 17:
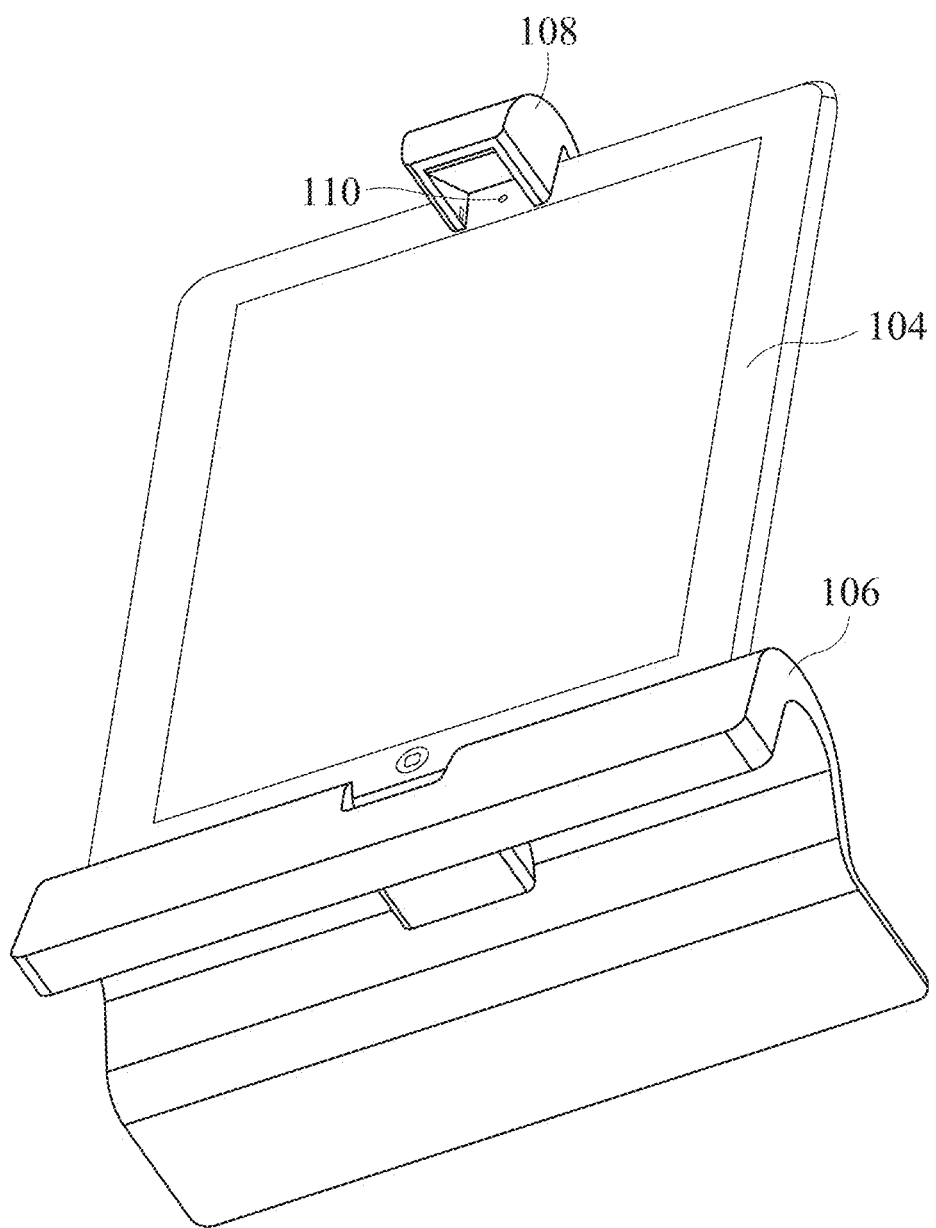
Figure 18:
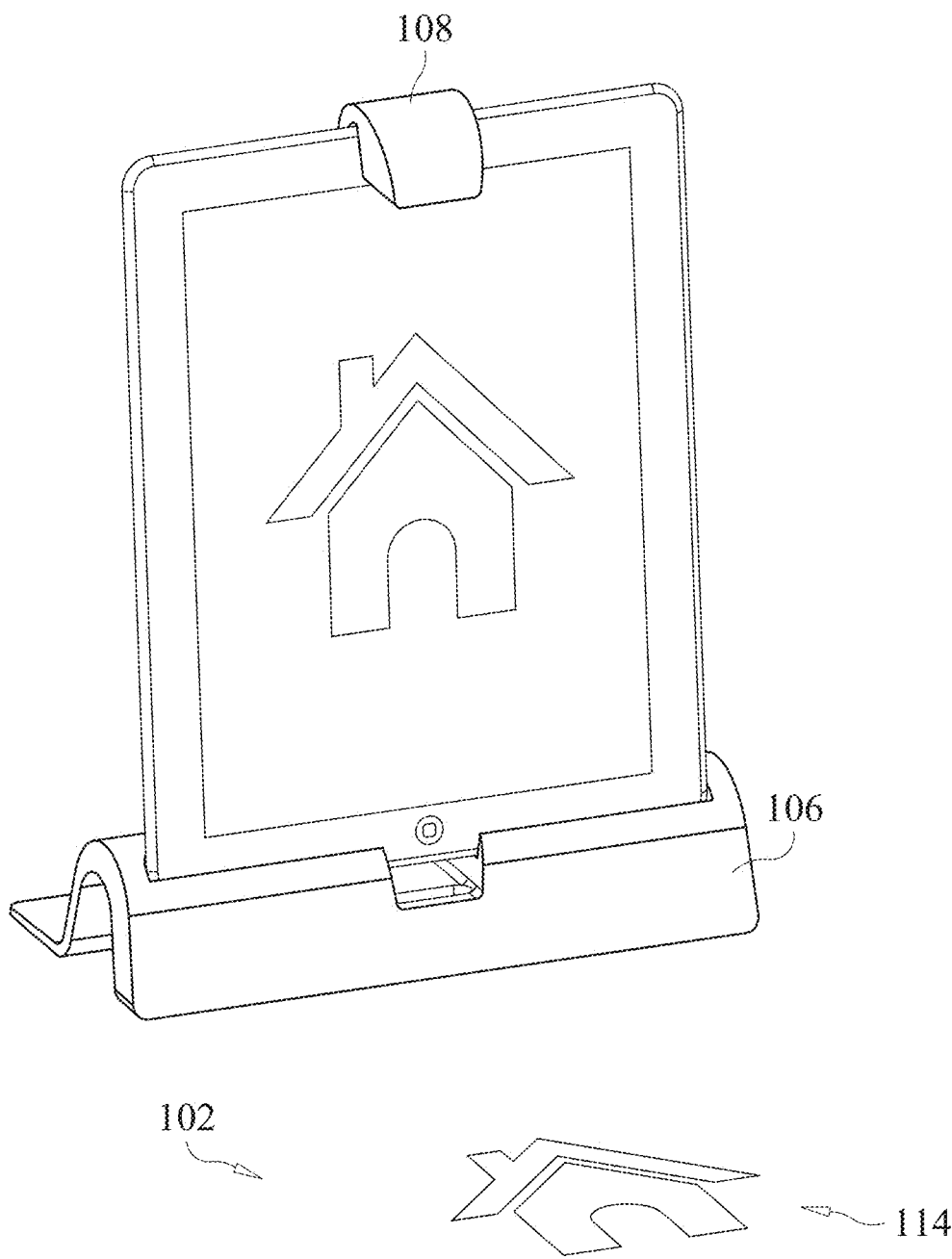

FIGS. 13A-14 depict additional non-limiting variations of virtualized tangible activities that may be provided to users via the platform. For instance, in FIGS. 13A and 13B, a user may draw a landscape including a tree and a sun in the activity scene 116 (e.g., on a piece of paper, on whiteboard or chalkboard, etc.). The activity application 214 may be a drawing application that is configured to interpret what is being drawn and may interact with the detection engine 212 to receive events including information describing the objects being drawn as well as other items in the activity scene 116 including the writing utensil and the user's drawing hand. For instance, as with tangible objects, the detector 304 may determine what is being drawn and communicate that information to the activity application 214. As another example, the detector 304 may detect and identify the writing utensil and the user's hand to the activity application 214, and the activity application 214 may omit those items from display while still reproducing the portion of the video images containing the drawing to thereby provide an unobstructed virtual rendering of what is being drawn. In some implementations, the activity application 214 may use past video frames to reproduce the areas being obscured so the virtual environment may appear complete even though a portion of the activity scene 116 may obscured by the user's hand and/or writing utensil. While not depicted, in some implementations, the activity application 214 can enhance the items being drawn by displaying complementary images (e.g., bushes, a pond, animals, etc.) in the virtual scene 1300. These complementary images may be retrieved from storage 310 and/or downloaded from the network 206 from another information source.

In FIG. 14, a user may use blocks to portray different real-world objects (e.g., a Christmas tree), and the detection engine 212 may recognize the objects formed in the physical scene 116 and communicate that information to the activity application 214, which may then render a digital representation of the object (e.g., tree) in the virtual scene 1400, which may be enhanced by the activity application 214. For instance, upon knowing the identity of the object portrayed in the activity scene 116, the activity application 214 may retrieve a corresponding record from the storage 310 that includes an enhanced virtual representation of that object and render it for display in the virtual scene 1400.

It should be understood that the above-described example activities are provided by way of illustration and not limitation and that numerous additional use cases are contemplated and encompassed by the present disclosure. For instance, white not depicted, by leveraging the detection engine 212, an activity application 214 may be configured to share and track the progress of a physical board game between two remotely located users. Each user may set up the same board game in their respective activity scenes 116, and the activity application 214 on each user's computing device 104 may virtualize the game for display to the users based on the events received from the detector 304. For instance, the activity applications 214 operating on each user's computing device 104 may display a synchronized virtual representation of the board game, track and display the movement of the game pieces, compute and display the score, provide tips and or help (e.g., game rules), etc. The instances of the activity application 214 may stay synchronized by sending one another updates reflecting changes in the state of the respective activity scenes 116, or by synchronizing via an intermediary (e.g., a server 202). Using this activity application 214, the users can enjoy the tangible gameplay of a board game together while residing in disparate geographic locations.

In further non-limiting examples, activity applications 214 could assist vision impaired individuals to learn to read braille using customized TI objects that include the braille and that are recognizable to the detection engine 212; re-animate how an image was drawn and share that re-animation (e.g., in a gif file) via a social network or another image sharing service with other users; can archive and show the progression on different objectives a user has been working on, can determine various characteristics of different items, such as size, area, etc., and provide informative supplementation information about such items, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   capturing, using a rear facing camera of a computing device, a video stream of a field of view of the rear facing camera, the video stream including an activity scene and a tangible interface object present in the activity scene;
   processing, using a processor of a computing device, the video stream for the tangible interface object and an attribute of the tangible interface object;
   determining, using the processor of the computing device, an identity of the tangible interface object using the attribute of the tangible interface object;
   generating, using the processor of the computing device, a virtual scene based on the attribute of the tangible interface object; and
   rendering, in a display of the computing device, the virtual scene in a region of the display.

2. The method of claim 1, wherein the field of view of the rear facing camera captures substantially only the activity scene.

3. The method of claim 1, wherein the field of view of the rear facing camera is redirected towards a front side of the computing device using a camera adapter.

4. The method of claim 3, wherein the activity scene is located in front of the computing device and wherein the camera adapter redirects the field of view of the rear facing camera by wrapping light reflected off of the activity scene into the rear facing camera.

5. The method of claim 3, wherein the camera adapter defines a side of the activity scene being captured.

6. The method of claim 1, wherein the video stream of the field of view of the rear facing camera is a first video stream, the virtual scene is a first virtual scene, and the region is a first region, the method further comprising:
capturing, using a front facing video capture device, a second video stream of a field of the front facing camera, the second video stream capturing a portion of an activity surface situated in front of the computing device;
generating, using the processor of the computing device, a second virtual scene based on the second video stream of the field of view of the front facing camera; and
rendering, the second virtual scene in a second region of the display, the second region of the display being separate from the first region of the display.

7. The method of claim 6, wherein the second video stream of the field of view of the front facing camera also captures a user scene that includes a user situated in front of the computing device.

8. The method of claim 7, wherein the second video stream of the field of view is a split field of view that splits the field of view into a first field of view that captures the user scene and a second field of view that captures a portion of the activity surface situated in front of the computing device.

9. A physical activity surface visualization system comprising:
a stand configured to position a computing device having one or more processors;
a rear facing camera configured to capture a video stream of a field of view of the rear facing camera, the video stream including an activity scene and a tangible interface object present in the activity scene;
a detector executable by the one or more processors to detect the tangible interface object and an attribute of the tangible interface object in the video stream; and
an activity application executable by the one or more processors to determine an identity of the tangible interface object using the attribute of the tangible interface object, generate a virtual scene based on the attribute of the tangible interface object; and
a display configured to render the virtual scene in a region of the display.

10. The physical activity surface visualization system of claim 9, wherein the field of view of the rear facing camera captures substantially only the activity scene.

11. The physical activity surface visualization system of claim 9, wherein the field of view of the rear facing camera is redirected towards a front side of the computing device using a camera adapter.

12. The physical activity surface visualization system of claim 11, wherein the activity scene is located in front of the computing device and wherein the camera adapter redirects the field of view of the rear facing camera by wrapping light reflected off of the activity scene into the rear facing camera.

13. The physical activity surface visualization system of claim 12, wherein the camera adapter defines a side of the activity scene being captured.

14. The physical activity surface visualization system of claim 9, wherein the video stream of the field of view of the rear facing camera is a first video stream, the virtual scene is a first virtual scene, and the region is a first region, the system further comprising:
a front facing camera configured to capture a second video stream of a field of view of the front facing camera, the second video stream capturing a portion of an activity surface situated in front of the computing device, and
wherein the activity application is further configured to generate a second virtual scene based on the second video stream of the field of view of the front facing camera, and
wherein the display is further configured to render the second virtual scene in a second region of the display.

15. The physical activity surface visualization system of claim 14, wherein the second video stream of the field of view of the front facing camera also captures a user scene that includes a user situated in front of the computing device.

16. The physical activity surface visualization system of claim 15, wherein the second video stream of the field of view is a split field of view that splits the field of view into a first field of view that captures the user scene and a second field of view that captures a portion of the activity surface situated in front of the computing device.

17. A method comprising:
capturing, using a rear facing camera of a computing device, a first video stream of a field of view of the rear facing camera;
capturing, using a front facing camera of the computing device, a second video stream of a field of view of the front facing camera;
processing, using a processor of the computing device, the first video stream and the second video stream for a tangible interface objects present in one of the first video stream and the second video stream;
detecting, using the processor of the computing device, an attribute of the tangible interface object;
determining, using, the processor of the computing device, an identity of the tangible interface object using the attribute;
generating, using the processor of the computing device, a virtual object based on the identity of the tangible interface object;
rendering, using the processor of the computing device, a first virtual scene based on the first video stream and a second virtual scene based on the second video stream; and
presenting, in a display of the computing device, the first virtual scene in a first region, the second virtual scene in a second region, and the virtual object.

18. The method of claim 17, wherein the tangible interface object is present in the first video stream and wherein presenting, the virtual object further comprises:
presenting using the processor of the computing device, the virtual object within the second virtual scene.

19. The method of claim 17, wherein the field of view of the rear facing camera is redirected towards an activity surface located in front of the computing device using a camera adapter.

20. The method of claim 19, wherein the camera adapter redirects the field of view of the rear facing camera by wrapping light reflected off of the activity surface into the rear facing camera.

* * * * *